(12) United States Patent
Shinoda et al.

(10) Patent No.: US 12,231,005 B2
(45) Date of Patent: Feb. 18, 2025

(54) MOTOR EQUIPPED WITH SENSOR

(71) Applicant: DENSO CORPORATION, Kariya (JP)

(72) Inventors: Seigo Shinoda, Kariya (JP); Masayuki Echizen, Kariya (JP); Naoto Natsume, Kariya (JP)

(73) Assignee: DENSO CORPORATION, Kariya (JP)

( * ) Notice: Subject to any disclaimer, the term of this patent is extended or adjusted under 35 U.S.C. 154(b) by 411 days.

(21) Appl. No.: 17/536,497

(22) Filed: Nov. 29, 2021

(65) Prior Publication Data
US 2022/0085697 A1    Mar. 17, 2022

Related U.S. Application Data

(63) Continuation of application No. PCT/JP2020/020565, filed on May 25, 2020.

(30) Foreign Application Priority Data

May 27, 2019   (JP) ................... 2019-098435

(51) Int. Cl.
    *H02K 11/21*      (2016.01)
    *H02K 1/27*      (2022.01)
    (Continued)

(52) U.S. Cl.
CPC ............. *H02K 11/215* (2016.01); *H02K 1/27* (2013.01); *H02K 3/28* (2013.01); *H02K 29/08* (2013.01);
(Continued)

(58) Field of Classification Search
CPC ...... H02K 11/215; H02K 29/08; H02K 11/21; H02K 2203/09; H02K 2211/03
See application file for complete search history.

(56) References Cited

U.S. PATENT DOCUMENTS

| | | | | |
|---|---|---|---|---|
| 4,638,197 A | * | 1/1987 | Kalagidis ............... | H02K 29/08 310/67 R |
| 7,663,274 B2 | * | 2/2010 | Kataoka ................. | H02K 29/08 310/68 R |

(Continued)

FOREIGN PATENT DOCUMENTS

| JP | S59-066379 U | 5/1984 |
|---|---|---|
| JP | 2007-189841 A | 7/2007 |

(Continued)

OTHER PUBLICATIONS

JP 2016214041 A—Machine Translation (Year: 2016).*
Jul. 28, 2020 International Search Report issued in Patent Application No. PCT/JP2020/020565.

*Primary Examiner* — Tran N Nguyen
*Assistant Examiner* — Masoud Vaziri
(74) *Attorney, Agent, or Firm* — Oliff PLC

(57) ABSTRACT

A motor includes a stator having a stator core and a coil. The stator core has a plurality of teeth arranged at intervals in a circumferential direction. The coil is formed of an electrically-conductive winding wound around the teeth. Moreover, the motor also includes a rotor having magnets arranged in radial opposition to the stator core and at intervals in the circumferential direction. The rotor is configured to rotate upon supply of electric current to the coil. Furthermore, the motor also includes a sensor arranged in a circumferentially intermediate area between a circumferentially-adjacent pair of the teeth in an axial view. The sensor is configured to detect magnetism of the magnets.

15 Claims, 26 Drawing Sheets

(51) Int. Cl.
*H02K 3/28* (2006.01)
*H02K 11/215* (2016.01)
*H02K 29/08* (2006.01)

(52) U.S. Cl.
CPC ...... *H02K 2203/09* (2013.01); *H02K 2211/03* (2013.01)

(56) References Cited

U.S. PATENT DOCUMENTS

| | | | |
|---|---|---|---|
| 2009/0108716 A1* | 4/2009 | Teshima | F04D 25/0646 310/68 B |
| 2011/0042599 A1* | 2/2011 | Arai | F16K 1/2263 251/251 |
| 2014/0156220 A1 | 6/2014 | Okamoto et al. | |
| 2015/0200576 A1* | 7/2015 | Kinashi | H02K 11/215 310/71 |
| 2016/0226339 A1* | 8/2016 | Niwa | H02K 1/27 |
| 2016/0336838 A1* | 11/2016 | Kouda | H02K 1/146 |
| 2019/0101413 A1* | 4/2019 | Murata | H02K 29/08 |
| 2020/0186000 A1 | 6/2020 | Kokubo et al. | |

FOREIGN PATENT DOCUMENTS

| | | | | |
|---|---|---|---|---|
| JP | 2007-318987 A | | 12/2007 | |
| JP | 2007-322227 A | | 12/2007 | |
| JP | 2008-022652 A | | 1/2008 | |
| JP | 2010-200417 A | | 9/2010 | |
| JP | 2016-208749 A | | 12/2016 | |
| JP | 2016214041 A | * | 12/2016 | ............ B25B 21/00 |
| JP | 2018-042421 A | | 3/2018 | |
| WO | 2014/156865 A1 | | 10/2014 | |

\* cited by examiner

MOTOR EQUIPPED WITH SENSOR

CROSS-REFERENCE TO RELATED APPLICATIONS

The present application is a continuation application of International Application No. PCT/JP2020/020565 filed on May 25, 2020, which is based on and claims priority from Japanese Patent Application No. 2019-098435 filed on May 27, 2019. The entire contents of these applications are incorporated by reference into the present application.

BACKGROUND

1 Technical Field

The present disclosure relates to motors.

2 Description of Related Art

Japanese Patent Application Publication No. JP 2018-042421 A discloses a motor that includes a sensor for detecting the position (or rotation angle) of a rotor. A stator of the motor disclosed in this patent document has a plurality of teeth arranged in a circumferential direction. Moreover, the sensor is arranged in a recess formed in one of the teeth.

SUMMARY

However, if a recess or the like is formed in one of the teeth to have the sensor arranged therein, the characteristics of the motor may be deteriorated.

The present disclosure has been accomplished in view of the above problem.

According to the present disclosure, there is provided a motor that includes: a stator including a stator core and a coil, the stator core having a plurality of teeth arranged at intervals in a circumferential direction, the coil being formed of an electrically-conductive winding wound around the teeth; a rotor having magnets arranged in radial opposition to the stator core and at intervals in the circumferential direction, the rotor being configured to rotate upon supply of electric current to the coil; and a sensor arranged in a circumferentially intermediate area between a circumferentially-adjacent pair of the teeth in an axial view, the sensor being configured to detect magnetism of the magnets.

With the above configuration, it becomes unnecessary to form a recess or the like in one of the teeth to have the sensor arranged therein. Consequently, it becomes possible to suppress deterioration of the characteristics of the motor.

BRIEF DESCRIPTION OF THE DRAWINGS

FIG. 2 is a perspective view showing the stator and the like.

FIG. 3 is an exploded perspective view showing the stator and the like.

FIG. 8 is a perspective view illustrating the positional relationship between a sensing point of the sensor and magnets and the like.

FIG. 20 is a cross-sectional view, taken along the line 20-20 in FIG. 19, of the circuit board and the like.

FIG. 21 is a cross-sectional view, taken along the line 21-21 in FIG. 17, of the stator, the rotor and the like.

FIG. 23 is a cross-sectional view, taken along the line 23-23 in FIG. 22, of the stator, the rotor and the like.

FIG. 28 is a cross-sectional view, taken along the line 28-28 in FIG. 27, of the stator, the rotor and the like.

DESCRIPTION OF EMBODIMENTS

First Embodiment

Figure 1:
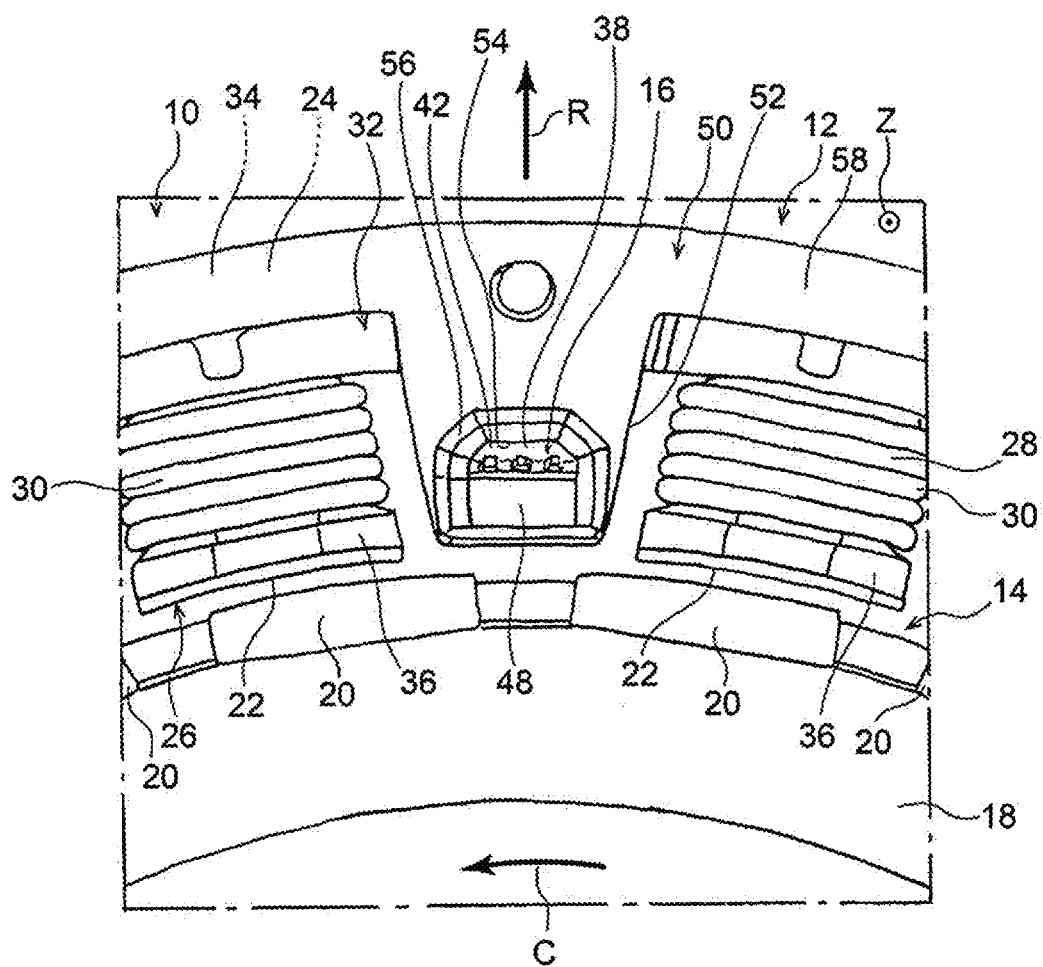
FIG. 1 is an enlarged plan view showing a stator, a rotor and the like which together constitute a motor according to a first embodiment.

A motor 10 according to the first embodiment of the present disclosure will be described with reference to FIGS. 1-4. In addition, the arrows Z, R and C suitably shown in the drawings respectively indicate one side in a rotation axial direction, the outer side in a rotation radial direction and one side in a rotation circumferential direction of a rotor 14 that will be described later. Moreover, in the case of merely indicating the axial direction, the radial direction and the circumferential direction, unless specified otherwise, the arrows Z, R and C respectively indicate the rotation axial direction, the rotation radial direction and the rotation circumferential direction of the rotor 14.

As shown in FIG. 1, the motor 10 of the present embodiment is a motor designed to be used as an actuator in a vehicle. For example, the motor 10 of the present embodiment may be a motor for an electric clutch. Specifically, an electric clutch system of the vehicle is configured to include the motor, a speed reducer and a rotation-translation mechanism. The torque generated by the motor is multiplied by a speed reduction ratio in the speed reducer and converted into a linear-motion direction force in the rotation-translation mechanism. The electric clutch system is connected with a multiple disc clutch via a coned disc spring or a piston. The speed reducer may be implemented by planetary gears or mechanical paradox planetary gears. The rotation-translation mechanism may be implemented by a ball cam. The motor 10 is configured to include a stator 12, the aforementioned rotor 14 that rotates upon generation of magnetism (or magnetic field) by the stator 12, and sensors 16 (i.e., magnetic sensors) for detecting the rotation angle of the rotor 14.

The rotor 14 is arranged radially inside the stator 12 that will be described later. The rotor 14 includes an annular rotor core 18 fixed on a rotating shaft that is not shown in the drawings, and a plurality of magnets 20 fixed to an outer peripheral part of the rotor core 18. The magnets 20 are formed to have a rectangular shape when viewed from the radially outer side. Moreover, the magnets 20 are arranged at constant intervals in the circumferential direction.

Figure 2:
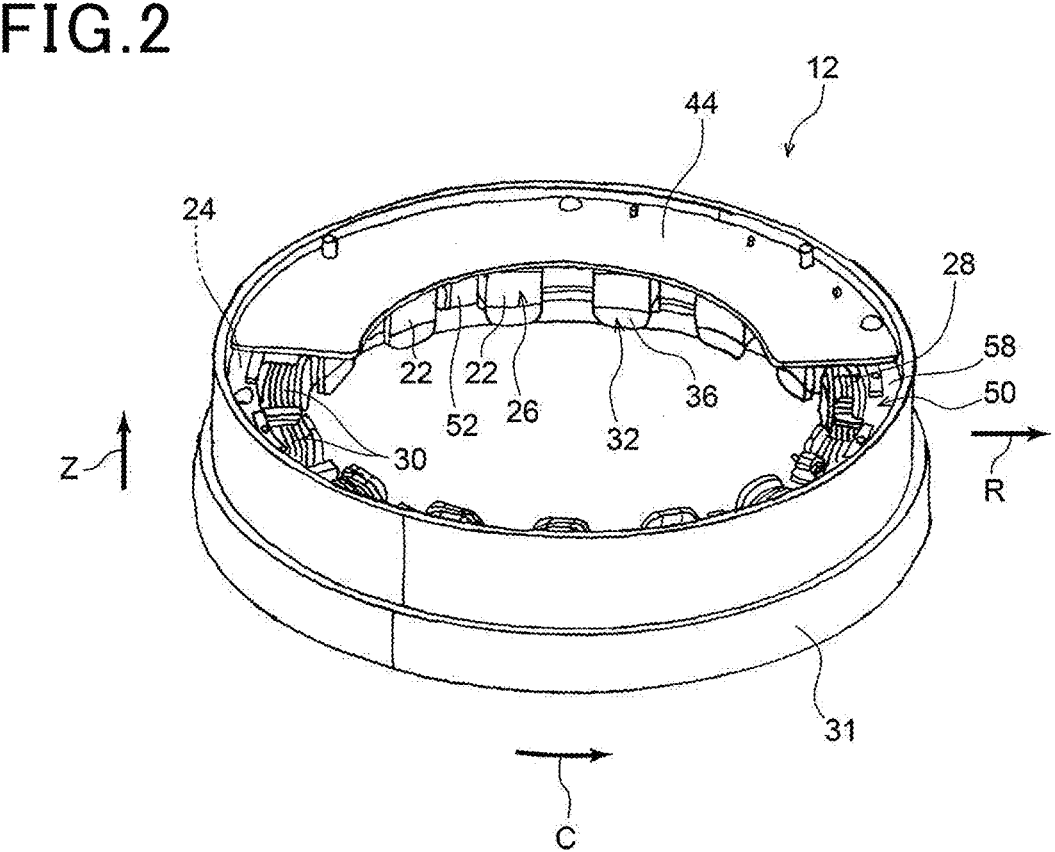
Figure 3:
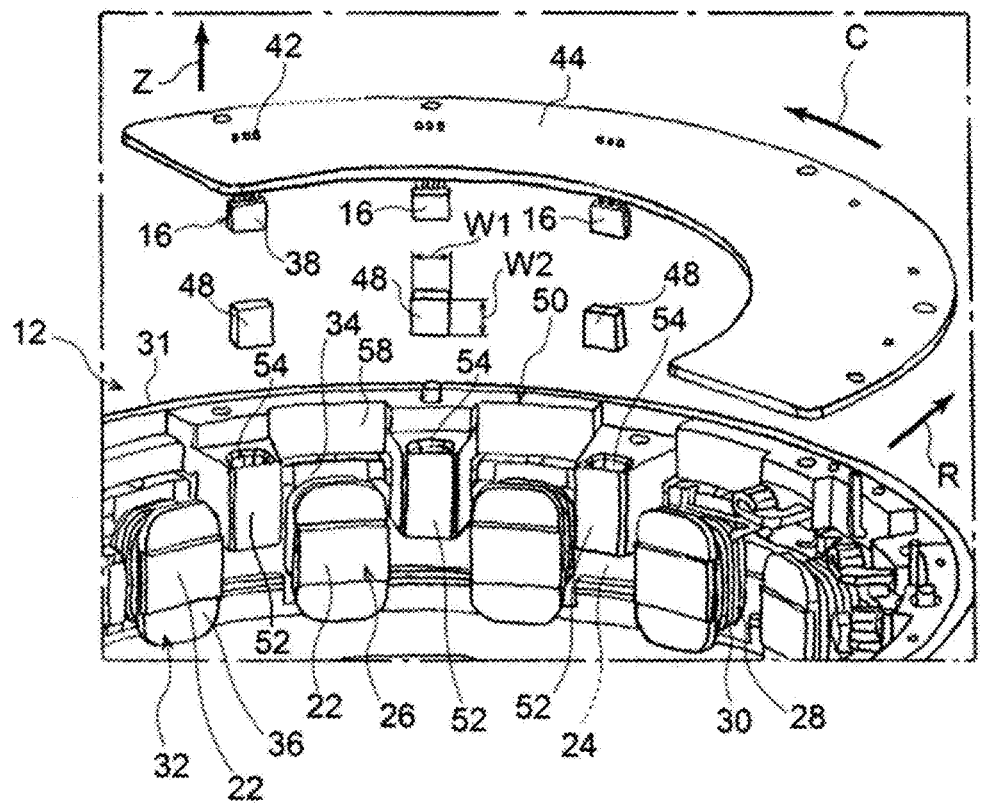

As shown in FIGS. 2 and 3, the stator 12 includes a stator core 26 that has a plurality of teeth 22 arranged at equal intervals in the circumferential direction and a back core 24 formed in an annular shape and connecting outer peripheral parts of the teeth 22 in the circumferential direction. Moreover, the stator 12 also includes a coil 30 that is formed by winding an electrically-conductive winding 28 around the teeth 22 of the stator core 26. In addition, the stator 12 is supported by an annular housing 31 arranged on the outer peripheral side of the stator 12.

To the stator core 26, there is mounted an insulator 32 that is formed of an electrically-insulative material such as a resin material. The insulator 32 has a back-core covering portion 34 that covers both axial end faces of the back core 24, and a tooth covering portion 36 that covers both axial end faces and both circumferential end faces of each of the teeth 22.

Figure 4:
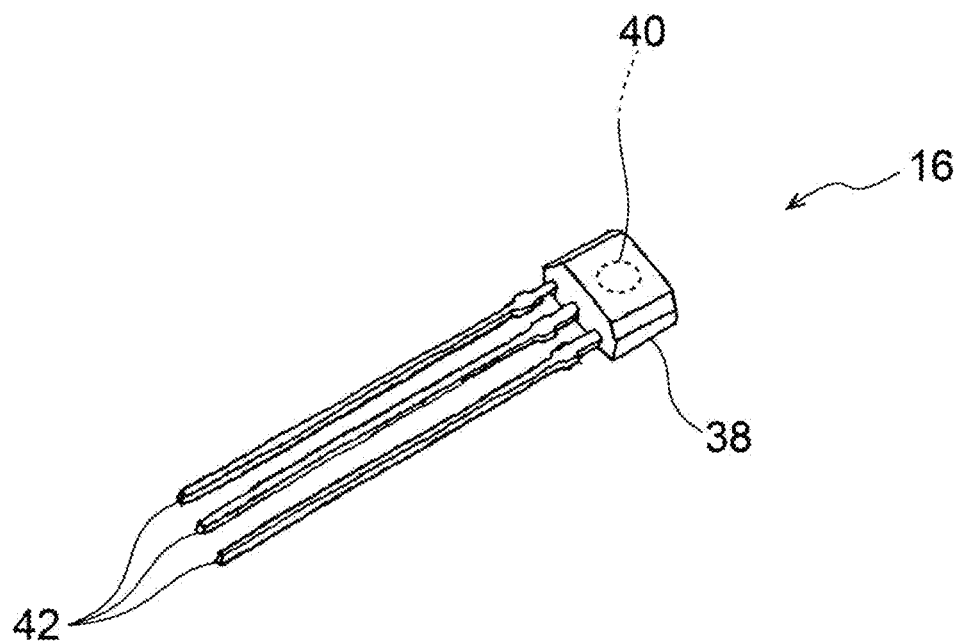
FIG. 4 is a perspective view showing a lead-type sensor.
Figure 5:
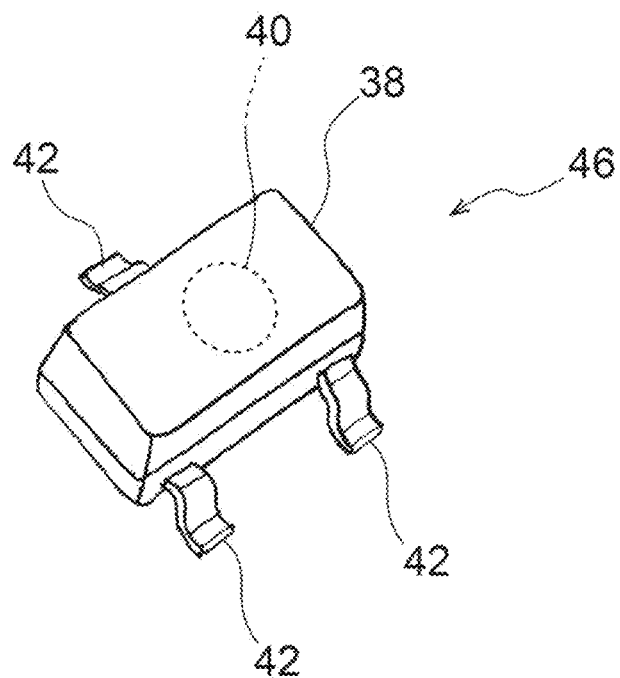
FIG. 5 is a perspective view showing a mount-type sensor.

As shown in FIGS. 3 and 4, the sensors 16 of the present embodiment are so-called lead-type magnetic sensors. Each of the sensors 16 includes a sensor body 38 that is formed in the shape of a rectangular block. A central portion of the sensor body 38 constitutes a sensing point 40 for sensing the magnetism of the magnets 20. Moreover, each of the sensors 16 also includes a plurality of (e.g., three in the present embodiment) legs 42 that protrude from the sensor body 38 toward one side thereof. Each of the sensors 16 is mounted to a circuit board 44 by soldering end portions of the legs 42, on the opposite side thereof to the sensor body 38, to the circuit board 44. In the present embodiment, the circuit board 44 is formed in a substantially U-shape so as to extend both radially and circumferentially with its thickness direction coinciding with the axial direction. When viewed along the axial direction, the circuit board 44 covers part of the stator 12 in the circumferential direction. Moreover, in the present embodiment, the three sensors 16 are mounted to the circuit board 44 such that they are located at equal intervals in the circumferential direction. Furthermore, in the state of having been mounted to the circuit board 44, the three sensors 16 protrude from the circuit board 44 to the other side in the axial direction. In addition, though the lead-type sensors 16 (i.e., magnetic sensors) are employed in the present embodiment, it is also possible to employ mount-type sensors 46 (i.e., magnetic sensors) as shown in FIG. 5. It should be noted that portions of the sensors 46 corresponding to those of the sensors 16 as shown in FIG. 4 are designated by the same reference numerals as the corresponding portions of the sensors 16.

As shown in FIGS. 1 and 3, on the radially inner side of the sensor body 38 of each of the sensors 16, there is provided a magnetism converging member 48 in close proximity to the sensor body 38 to converge the magnetism of the magnets 20 of the rotor 14. The magnetism converging member 48 is formed of a magnetic material, such as iron, in a rectangular plate shape or a rectangular block shape. Moreover, the circumferential and axial dimensions W1 and W2 of the magnetism converging member 48 are set so that when viewed along the radial direction, the magnetism converging member 48 covers the sensing point 40 (see FIG. 4) of the sensor body 38.

The sensor bodies 38 of the sensors 16 and the magnetism converging members 48 are held (or supported) by a busbar 50 that is mounted to the insulator 32. As shown in FIG. 3, the busbar 50 is formed of an electrically-insulative material such as a resin material. The busbar 50 has three sensor-holding portions 52 each of which is arranged between a circumferentially-adjacent pair of the teeth 22. Moreover, each of the sensor-holding portions 52 is formed in a prismatic shape such that both axial end faces (i.e., bottom faces) thereof are shaped in an equilateral trapezoid tapering radially inward. In addition, the dimension from the end face (i.e., bottom face) on one axial side to the end face (i.e., bottom face) on the other axial side in each of the sensor-holding portions 52 is set such that the axial end faces (i.e., bottom faces) of each of the sensor-holding portions 52 do not protrude respectively from coil ends (i.e., axial ends of the coil 30) to one axial side and the other axial side.

On the radially inner side in each of the sensor-holding portions 52, there is formed a sensor insertion hole 54 that opens on the one side in the axial direction. Further, a portion 56 of the sensor insertion hole 54 on the one side in the axial direction is formed to expand toward the one side in the axial direction. Moreover, in the present embodiment, a corresponding one of the magnetism converging members 48 is held in a radially inner space on the closed end side (i.e., the other side in the axial direction) in the sensor insertion hole 54. Further, the sensor body 38 of a corresponding one of the sensors 16 is held in a radially outer space on the closed end side (i.e., the other side in the axial direction) in the sensor insertion hole 54.

The busbar 50 also has a fixing portion 58 that is formed in an annular shape and connects outer peripheral parts of the three sensor-holding portions 52 in the circumferential direction. The busbar 50 is mounted to the insulator 32 by fixing the fixing portion 58 to a surface of the back-core covering portion 34 of the insulator 32 on the one side in the axial direction.

Next, a process of inserting the magnetism converging members 48 and the sensor bodies 38 of the sensors 16 into the corresponding sensor insertion holes 54 will be described.

Figure 6:
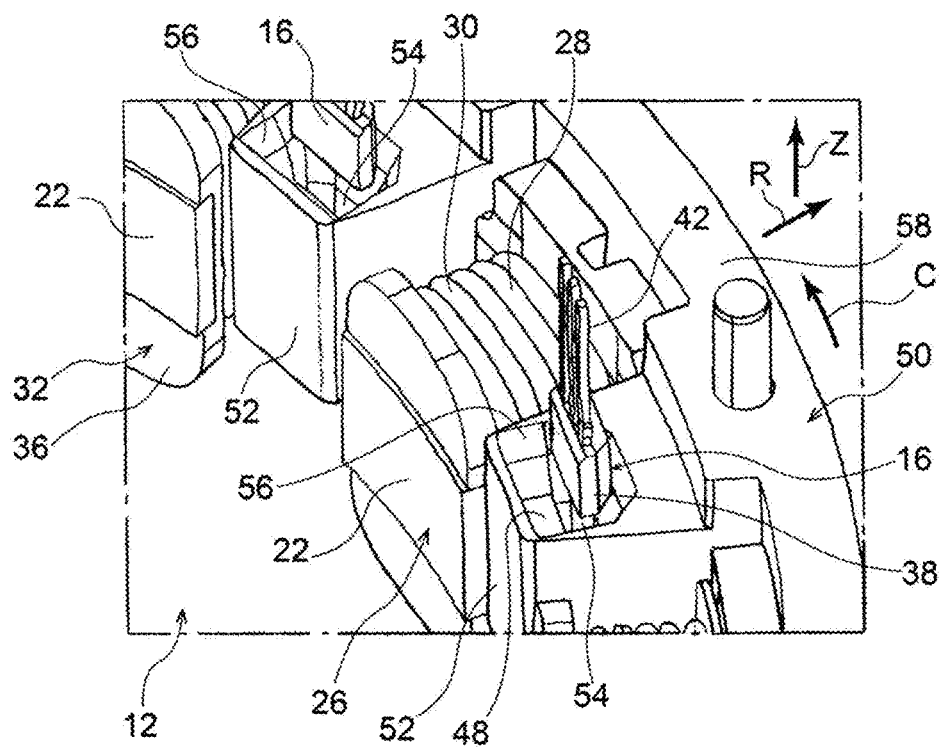
FIG. 6 is a perspective view illustrating a process of inserting a sensor into a sensor insertion hole of a sensor-holding portion.

FIG. 3 shows the stator 12 and the like with the busbar 50 mounted to the insulator 32. First, each of the three magnetism converging members 48 is inserted into the radially inner space on the closed end side in the sensor insertion hole 54 formed in a corresponding one of the three sensor-holding portions 52 of the busbar 50. Consequently, as shown in FIG. 6, each of the three magnetism converging members 48 is held in the radially inner space on the closed end side in the sensor insertion hole 54 formed in the corresponding one of the three sensor-holding portions 52 of the busbar 50.

Figure 7:
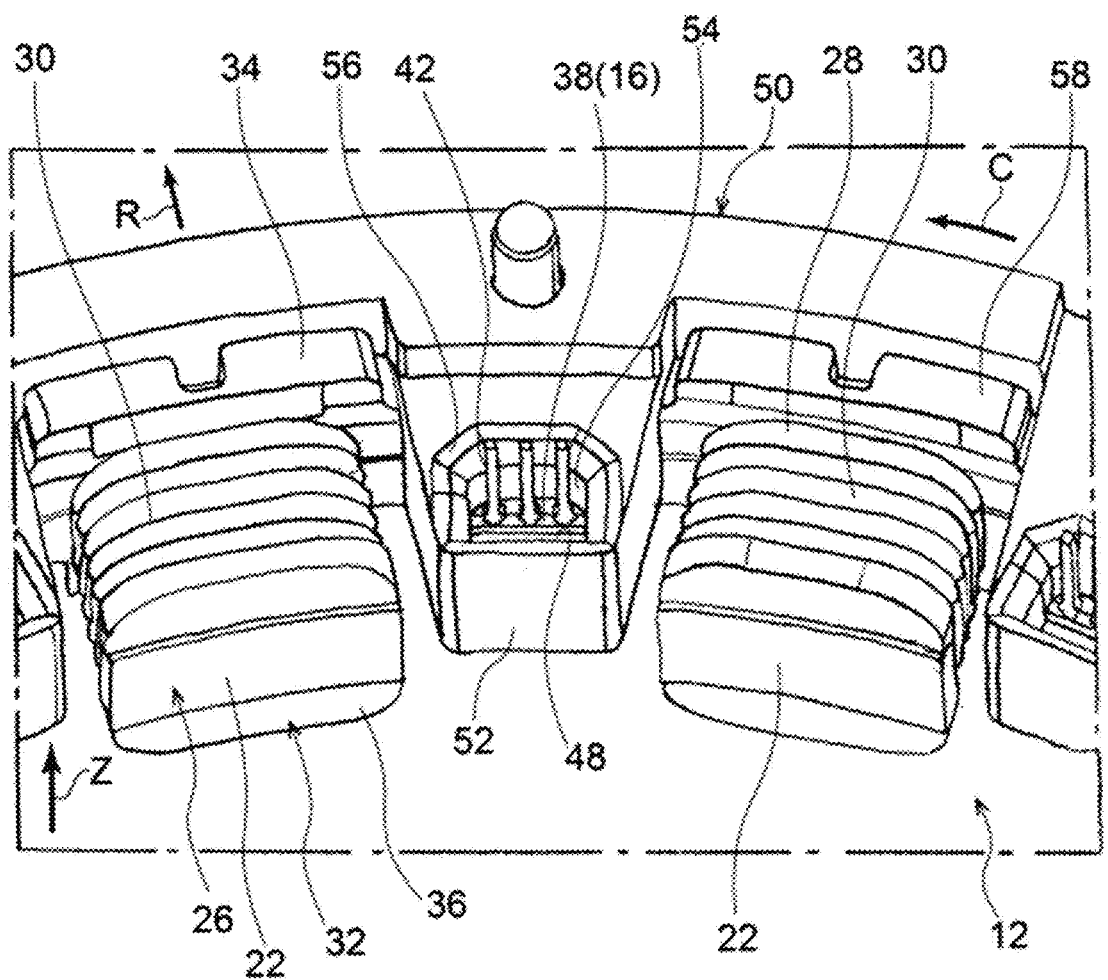
FIG. 7 is a perspective view showing a state where the insertion of the sensor into the sensor insertion hole has been completed.

Next, as shown in FIG. 3, by moving the circuit board 44 with the three sensors 16 mounted thereto to the other side in the axial direction, the sensor body 38 of each of the three sensors 16 is inserted into the radially outer space on the closed end side in the sensor insertion hole 54 formed in a corresponding one of the three sensor-holding portions 52 of the busbar 50. Consequently, as shown in FIGS. 6 and 7, the sensor body 38 of each of the three sensors 16 is held in the radially outer space on the closed end side in the sensor insertion hole 54 formed in the corresponding one of the three sensor-holding portions 52 of the busbar 50.

Moreover, in the state where the sensor body 38 of each of the three sensors 16 is held in the radially outer space on the closed end side in the sensor insertion hole 54 formed in the corresponding one of the three sensor-holding portions 52 of the busbar 50, an outer peripheral part of the circuit board 44 abuts a surface of the fixing portion 58 of the busbar 50 on the one side in the axial direction, as shown in FIG. 2. In this state, the outer peripheral part of the circuit board 44 is fixed to the fixing portion 58 of the busbar 50. In addition, in the case of employing the sensors 46 as shown in FIG. 5 instead of the sensors 16, each of the sensors 46 may be inserted along with part of the circuit board 44 into the corresponding sensor insertion hole 54.

Figure 8:
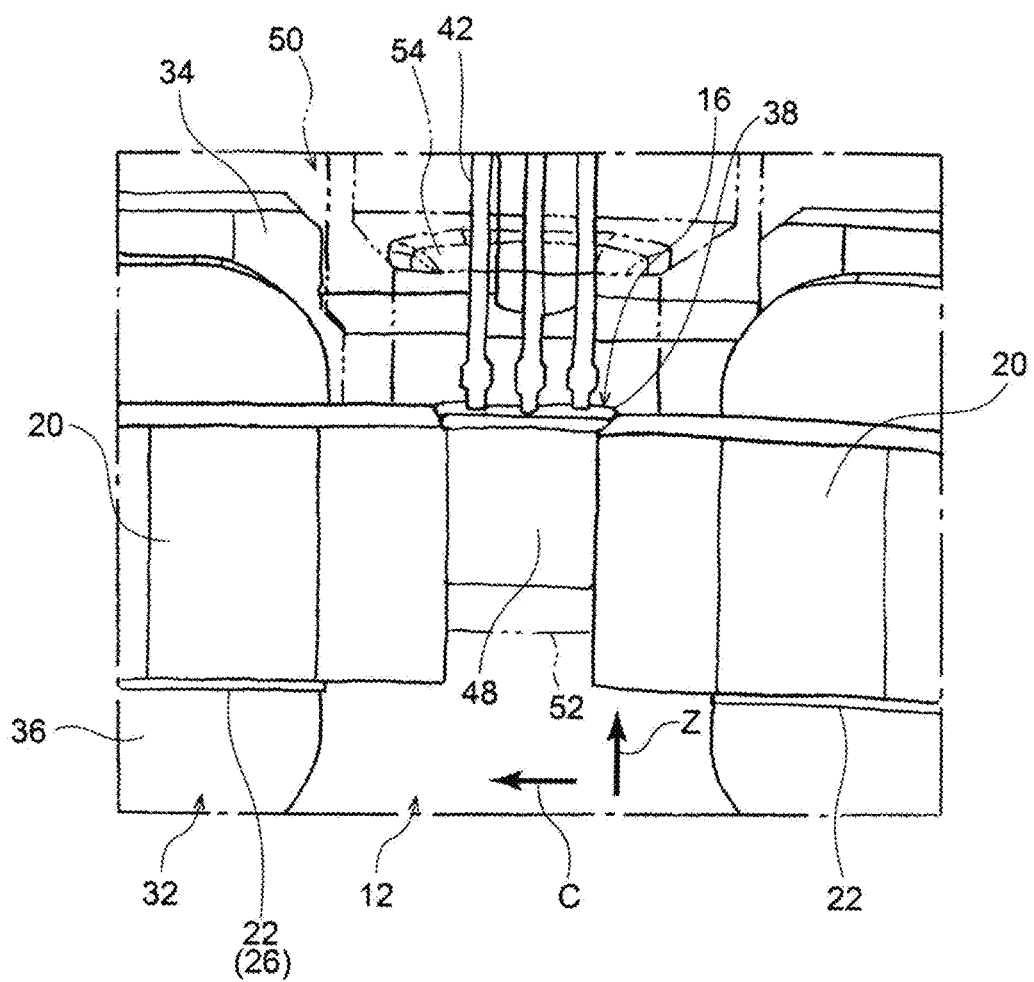

FIG. 8 shows the stator 12 viewed from the side of a rotation center of the rotor 14. In addition, in this figure, depiction of the rotor core 18 of the rotor 14 is omitted and the busbar 50 is shown by imaginary lines (i.e., dashed lines). As shown in this figure, in a state of being held on the closed end side in the sensor insertion hole 54 formed in one of the three sensor-holding portions 52 of the busbar 50, each corresponding pair of one of the three magnetism converging members 48 and one of the sensor bodies 38 of the three sensors 16 is located in a circumferentially and axially intermediate area (more particularly, at substantially the center in the present embodiment) between a circumferentially-adjacent pair of the teeth 22.

Next, operation and effects of the motor 10 according to the present embodiment will be described.

As shown in FIG. 1, in the motor 10 according to the present embodiment, upon supply of electric current to the coil 30 of the stator 12, a rotating magnetic field is generated around the stator 12, causing the rotor 14 to rotate.

With rotation of the rotor 14, the magnets 20 of the rotor 14 successively pass through the radially inner side of the sensor body 38 of each of the sensors 16. Then, change in the magnetic flux density of the magnets 20 at the position of the sensor body 38 thereof is detected by each of the sensors 16. Consequently, the rotation angle and/or the rotational speed of the rotor 14 can be calculated based on the detection results.

Moreover, in the present embodiment, each of the sensors 16 for detecting change in the magnetic flux density of the magnets 20 is arranged between a circumferentially-adjacent pair of the teeth 22. With such a configuration, it becomes unnecessary to form recesses or the like in the teeth 22 to have the sensors 16 arranged therein. Consequently, it becomes possible to suppress deterioration of the characteristics of the motor 10.

Further, in the present embodiment, each of the magnetism converging members 48 for converging the magnetism of the magnets 20 of the rotor 14 is provided in close proximity to the sensor body 38 of a corresponding one of the sensors 16. Consequently, it becomes possible to suppress variation in the detection of change in the magnetism of the magnets 20 by the sensors 16.

Hereinafter, analysis results of the effect of the magnetism converging members 48 will be described.

In FIGS. 9A-9D, there are respectively shown a stator 12A of a first analytical model, a stator 12B of a second analytical model, a stator 12C of a third analytical model and a stator 12D of a fourth analytical model. It should be noted that in the stators 12A, 12B, 12C and 12D of these analytical models, members and portions corresponding to those in the above-described stator 12 (see FIG. 1) are designated by the same reference numerals as the corresponding members and portions in the stator 12.

Figure 9A:
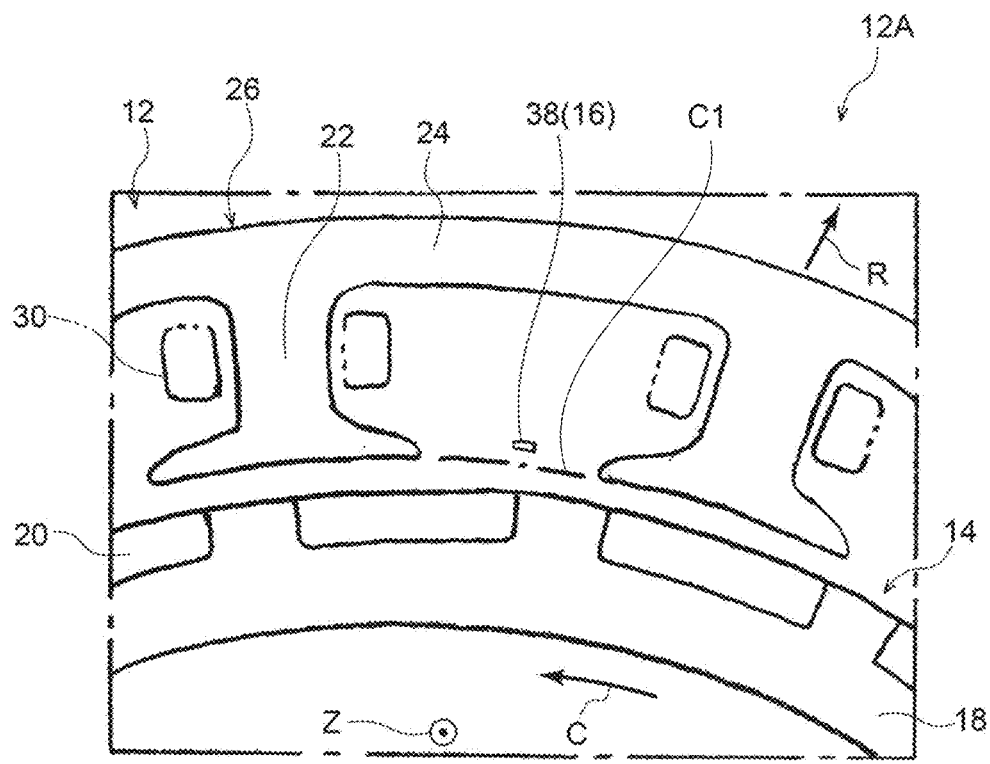
FIG. 9A is an enlarged plan view illustrating a first analytical model subject to a first analysis condition.

As shown in FIG. 9A, the stator 12A of the first analytical model include no magnetism converging members 48 as described above. Moreover, the analysis of the stator 12A of the first analytical model was performed on the assumption that an air layer having a circumferential width of 1 mm and a radial thickness of 0.5 mm intervenes between an imaginary circle C1, which connects the radially inner ends of the teeth 22 in the circumferential direction, and the sensor body 38 of each of the sensors 16. In addition, the diameter of the imaginary circle C1 is 90.1 mm.

Figure 9B:
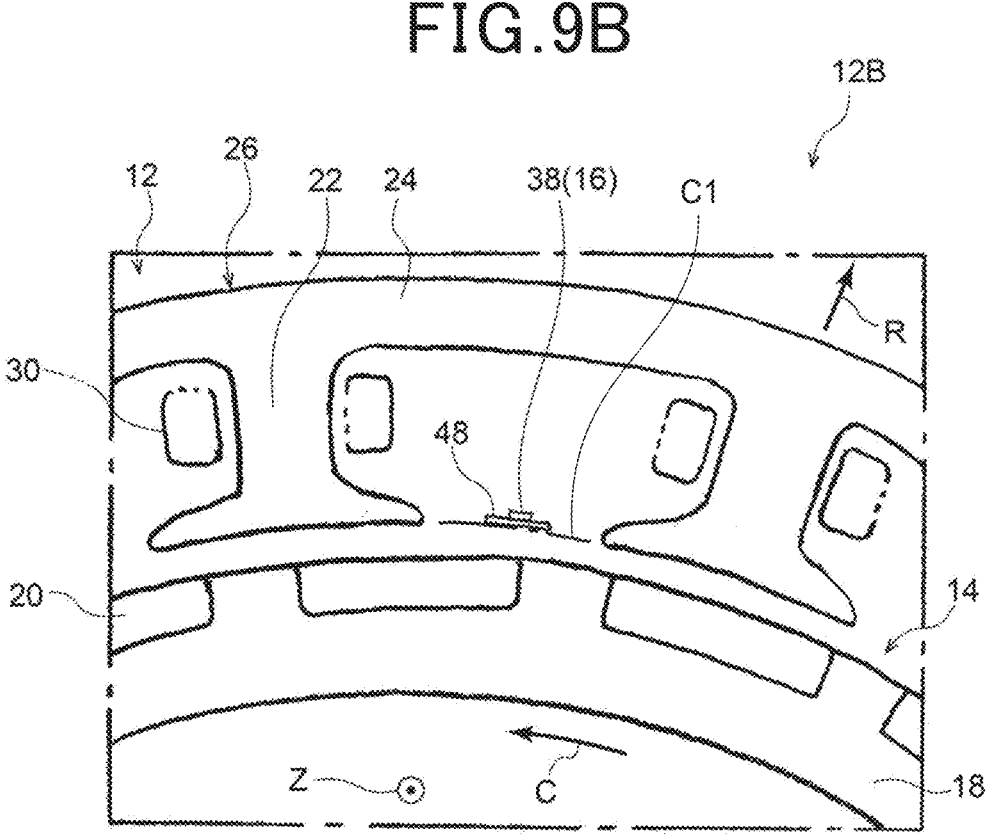
FIG. 9B is an enlarged plan view illustrating a second analytical model subject to a second analysis condition.
Figure 9C:
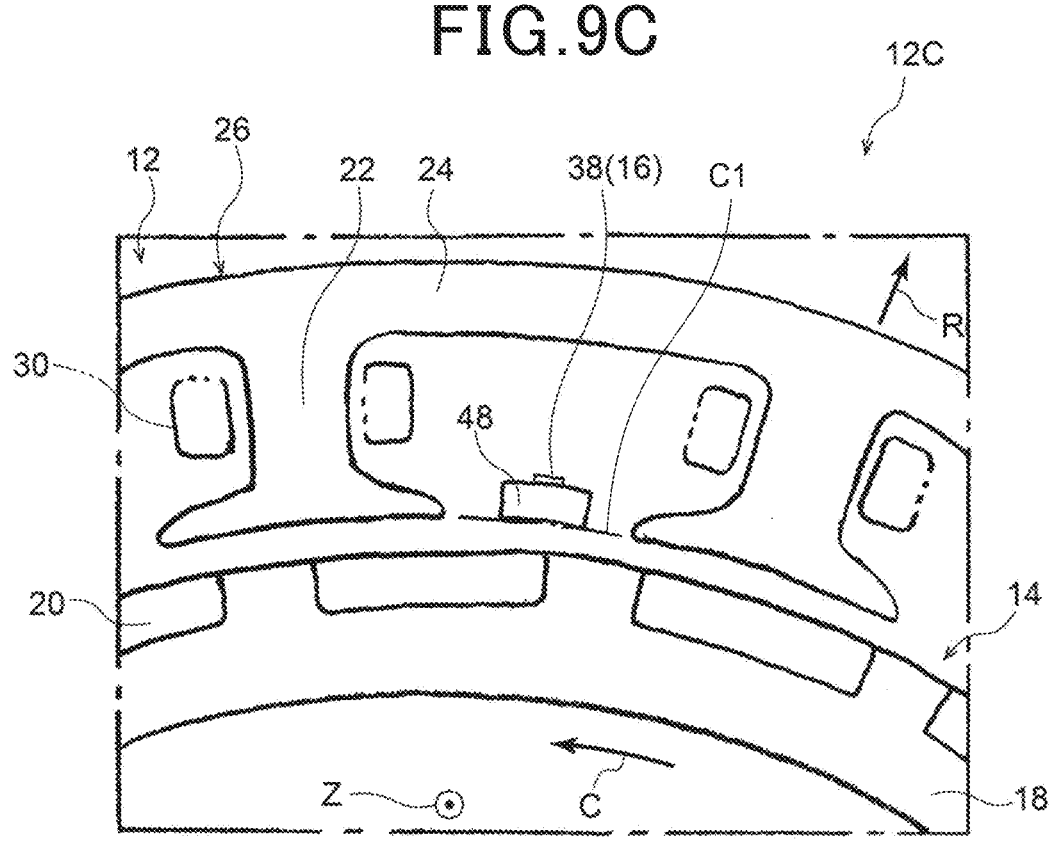
FIG. 9C is an enlarged plan view illustrating a third analytical model subject to a third analysis condition.
Figure 9D:
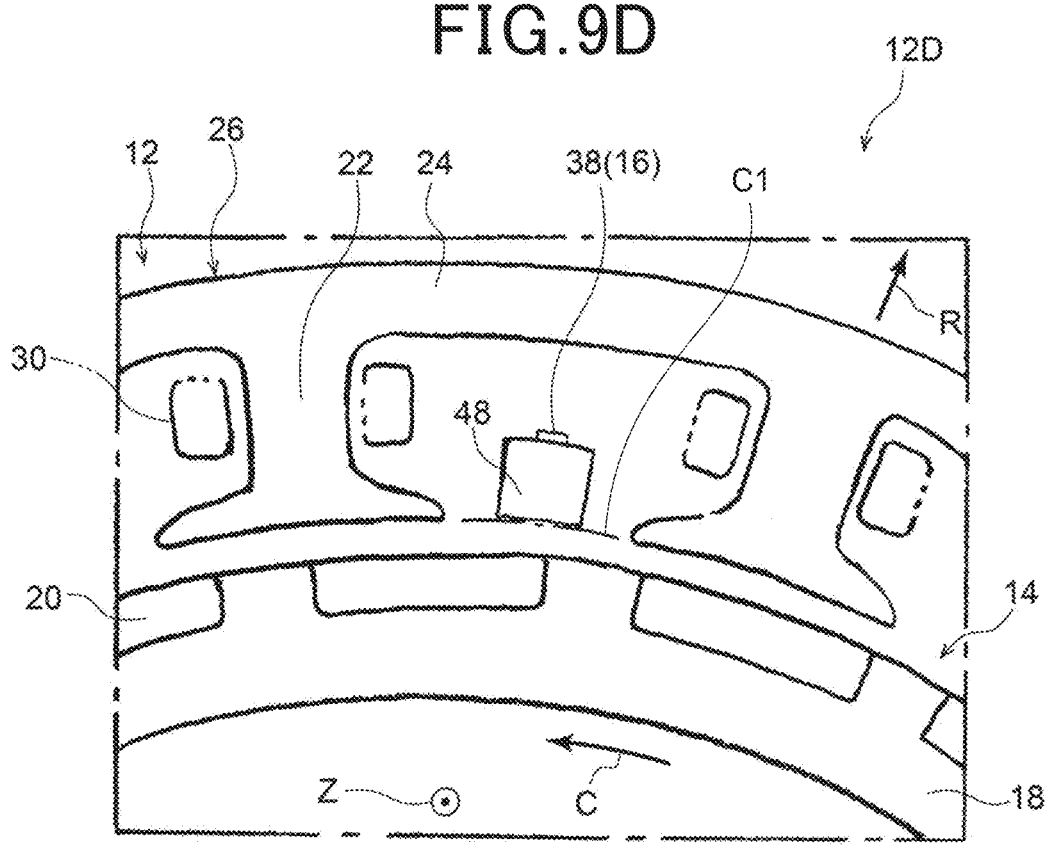
FIG. 9D is an enlarged plan view illustrating a fourth analytical model subject to a fourth analysis condition.

On the other hand, as shown in FIGS. 9B-9D, the stators 12B, 12C and 12D of the second, third and fourth analytical models include magnetism converging members 48 as described above. The circumferential center of the radially inner surface of each of the magnetism converging members 48 is located on the imaginary circle C1 that connects the radially inner ends of the teeth 22 in the circumferential direction. Moreover, the analysis of the stator 12B of the second analytical model was performed on the assumption that a magnetism converging member 48 having a circumferential width of 4 mm and a radial thickness of 0.5 mm intervenes between the imaginary circle C1, which connects the radially inner ends of the teeth 22 in the circumferential direction, and the sensor body 38 of each of the sensors 16. The analysis of the stator 12C of the third analytical model was performed on the assumption that a magnetism converging member 48 having a circumferential width of 4 mm and a radial thickness of 2 mm intervenes between the imaginary circle C1, which connects the radially inner ends of the teeth 22 in the circumferential direction, and the sensor body 38 of each of the sensors 16. The analysis of the stator 12D of the fourth analytical model was performed on the assumption that a magnetism converging member 48 having a circumferential width of 4 mm and a radial thickness of 4 mm intervenes between the imaginary circle C1, which connects the radially inner ends of the teeth 22 in the circumferential direction, and the sensor body 38 of each of the sensors 16.

Figure 10A:
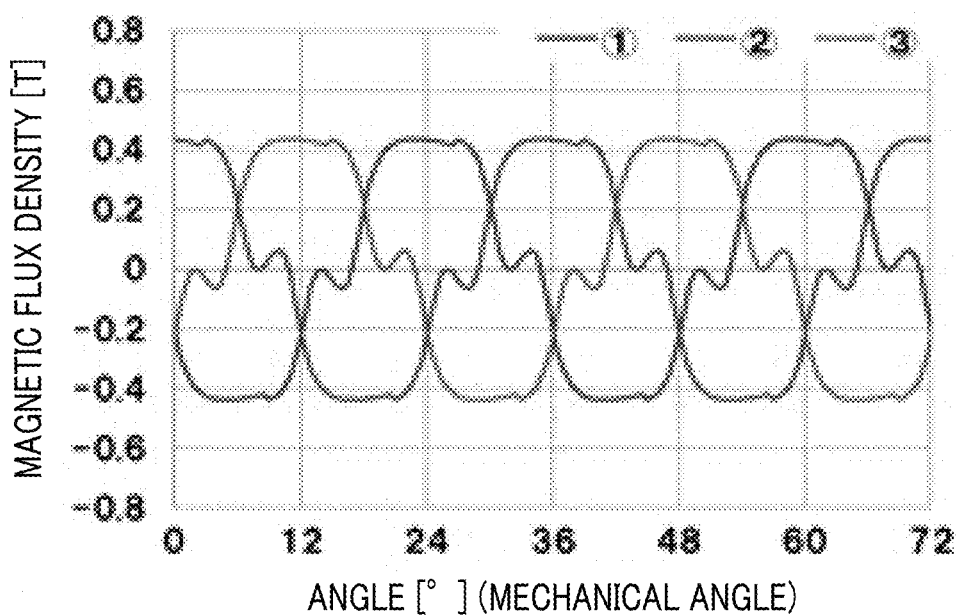
FIG. 10A is a graph showing the waveform of magnetic flux density detected by the sensor at a stator inner-diameter position in the first analytical model.
Figure 10B:
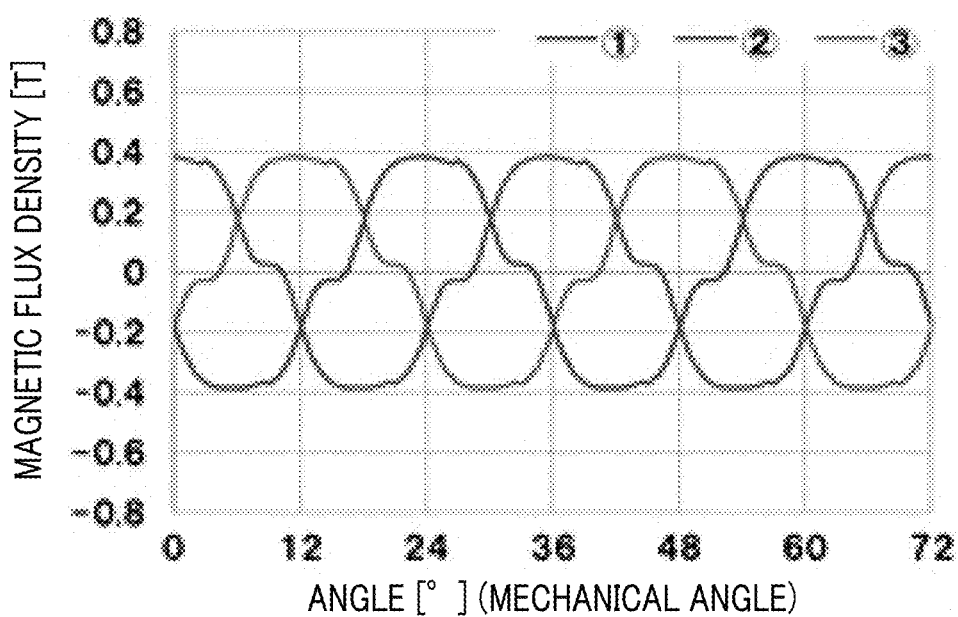
FIG. 10B is a graph showing the waveform of magnetic flux density detected by the sensor at the position of an outer peripheral surface of an air layer in the first analytical model.

FIG. 10A shows a graph representing the change in magnetic flux density at the position of the imaginary circle C1 (see FIG. 9A) in the stator 12A of the first analytical model. FIG. 10B shows a graph representing the change in magnetic flux density at the circumferential position (shown respectively by (1), (2), and (3)) of the sensor body 38 (see FIG. 9A) of each of the sensors 16 in the stator 12A of the first analytical model.

Figure 11A:
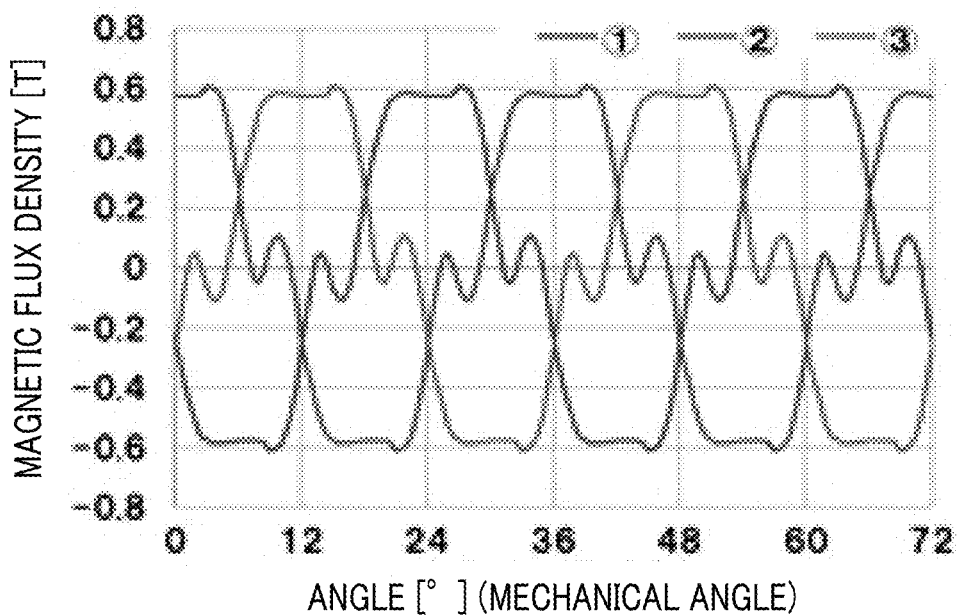
FIG. 11A is a graph showing the waveform of magnetic flux density detected by the sensor at a stator inner-diameter position in the second analytical model.
Figure 11B:
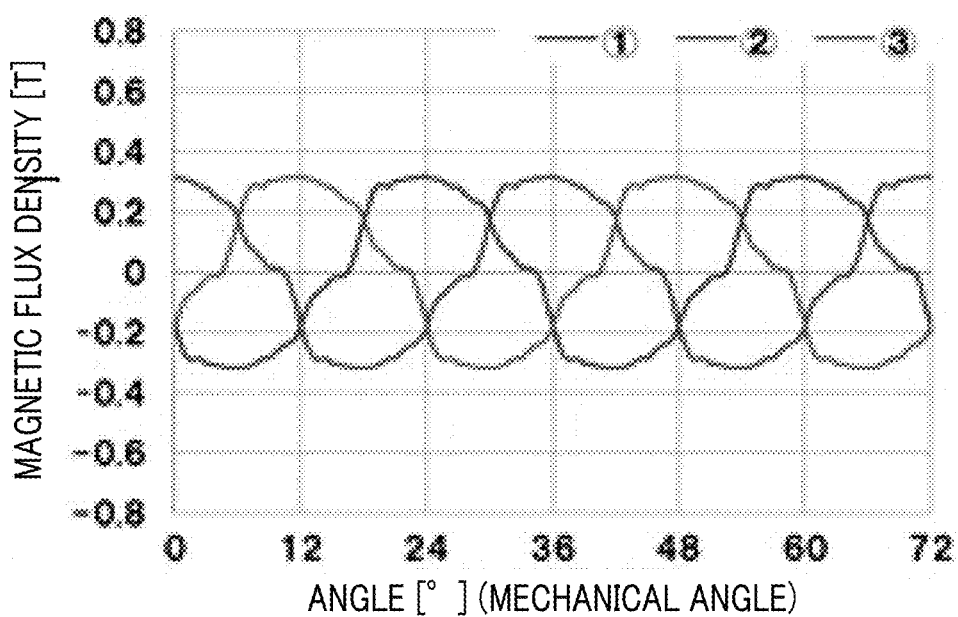
FIG. 11B is a graph showing the waveform of magnetic flux density detected by the sensor at the position of an outer peripheral surface of a magnetism converging member in the second analytical model.

FIG. 11A shows a graph representing the change in magnetic flux density at the position of the imaginary circle C1 (see FIG. 9B) in the stator 12B of the second analytical model. FIG. 11B shows a graph representing the change in magnetic flux density at the position of the sensor body 38 (see FIG. 9B) of each of the sensors 16 in the stator 12B of the second analytical model.

Figure 12A:
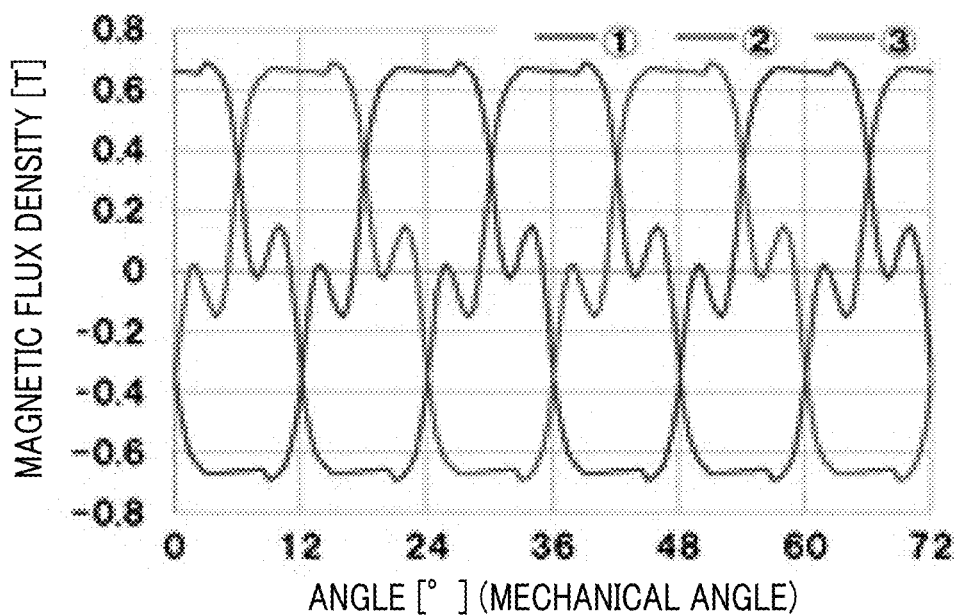
FIG. 12A is a graph showing the waveform of magnetic flux density detected by the sensor at a stator inner-diameter position in the third analytical model.
Figure 12B:
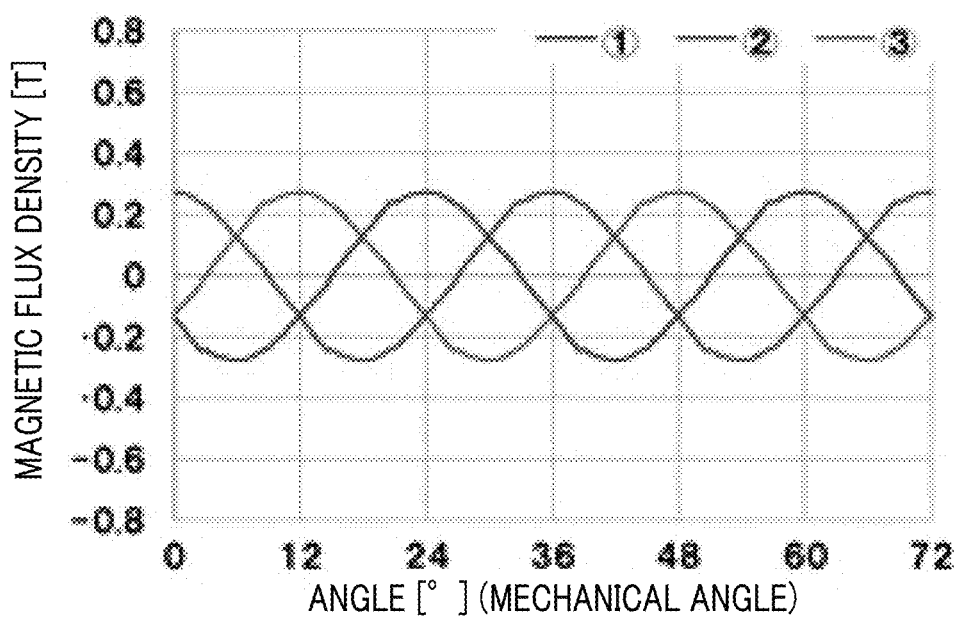
FIG. 12B is a graph showing the waveform of magnetic flux density detected by the sensor at the position of an outer peripheral surface of a magnetism converging member in the third analytical model.

FIG. 12A shows a graph representing the change in magnetic flux density at the position of the imaginary circle C1 (see FIG. 9C) in the stator 12C of the third analytical model. FIG. 12B shows a graph representing the change in magnetic flux density at the position of the sensor body 38 (see FIG. 9C) of each of the sensors 16 in the stator 12C of the third analytical model.

Figure 13A:
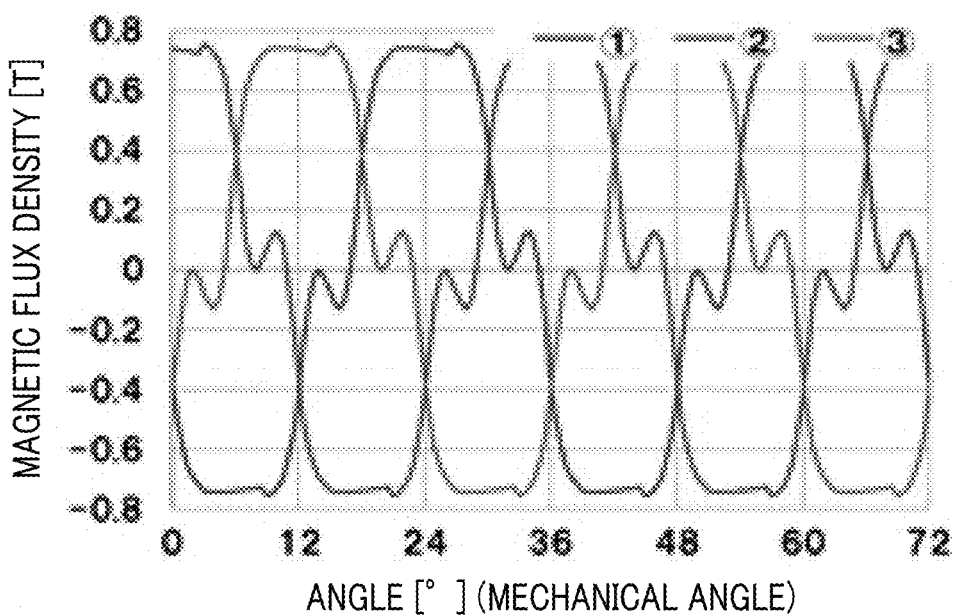
FIG. 13A is a graph showing the waveform of magnetic flux density detected by the sensor at a stator inner-diameter position in the fourth analytical model.
Figure 13B:
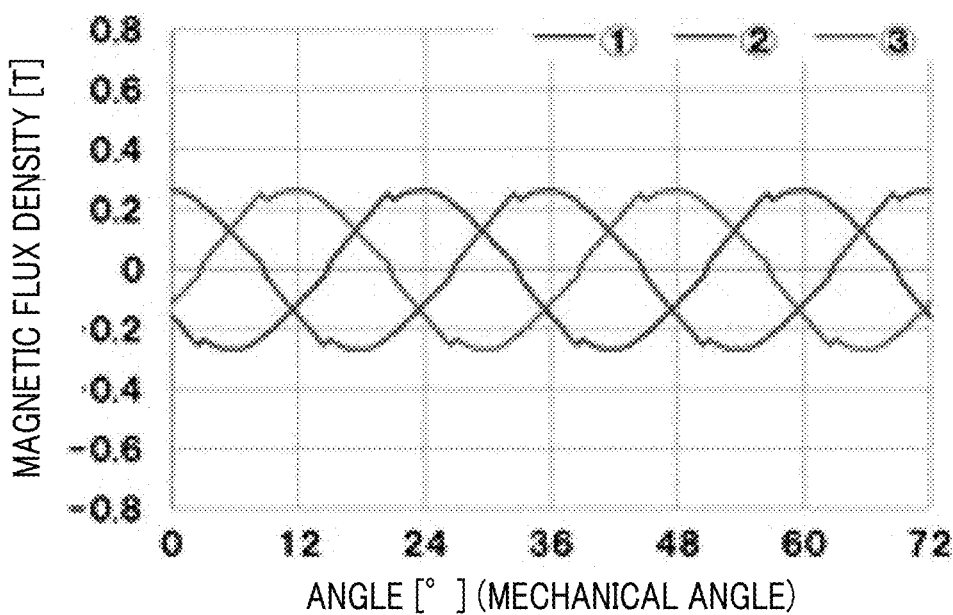
FIG. 13B is a graph showing the waveform of magnetic flux density detected by the sensor at the position of an outer peripheral surface of a magnetism converging member in the fourth analytical model.

FIG. 13A shows a graph representing the change in magnetic flux density at the position of the imaginary circle C1 (see FIG. 9D) in the stator 12D of the fourth analytical model. FIG. 13B shows a graph representing the change in magnetic flux density at the position of the sensor body 38 (see FIG. 9D) of each of the sensors 16 in the stator 12D of the fourth analytical model.

As shown in FIGS. 10A, 11A, 12A, and 13A, the magnetic flux density at the position of the imaginary circle C1 (see FIG. 9B) is higher in the stators 12B, 12C and 12D of the second, third and fourth analytical models including the magnetism converging members 48 than in the stator 12A of the first analytical model including no magnetism converging members 48. Moreover, as shown in FIGS. 11A, 12A, and 13A, in the stators 12B, 12C and 12D of the second, third and fourth analytical models including the magnetism converging members 48, the magnetic flux density at the position of the imaginary circle C1 (see FIG. 9B) increases with increase in the thickness of the magnetism converging members 48.

Furthermore, as shown in FIGS. 11B, 12B and 13B, comparing the change (or waveform) of magnetic flux density at the position of the sensor body 38 of each of the sensors 16 in the stator 12B of the second analytical model with the change (or waveform) of magnetic flux density at the position of the sensor body 38 of each of the sensors 16 in the third and fourth stators 12C and 12D of the third and fourth analytical models, it can be seen that variation in the change (or waveform) of magnetic flux density at the position of the sensor body 38 of each of the sensors 16 is smaller in the case of the thickness of the magnetism converging members 48 being equal to 2 mm or 4 mm than in the case of the thickness of the magnetism converging members 48 being equal to 0.5 mm. Moreover, comparing the change (or waveform) of magnetic flux density at the position of the sensor body 38 of each of the sensors 16 in the stator 12C of the third analytical model with the change (or waveform) of magnetic flux density at the position of the sensor body 38 of each of the sensors 16 in the stator 12D of the fourth analytical model, it can be seen that there is almost no difference in variation in the change (or waveform) of magnetic flux density at the position of the sensor body 38 of each of the sensors 16 between the case of the thickness of the magnetism converging members 48 being equal to 2 mm and the case of the thickness of the magnetism converging members 48 being equal to 4 mm. From the above, it can be concluded that setting the ratio of the thickness to the width of the magnetism converging members 48 to be higher than or equal to 1/2, variation in the change (or waveform) of magnetic flux density at the position of the sensor body 38 of each of the sensors 16 can be suppressed.

In addition, it is preferable for the circumferential center of the radially inner surface of each of the magnetism converging members 48 to be located on the imaginary circle C1 that connects the radially inner ends of the teeth 22 in the circumferential direction. However, it should be noted that the circumferential center of the radially inner surface of each of the magnetism converging members 48 may alternatively be located radially outside the imaginary circle C1.

In the present embodiment, with each corresponding pair of one of the sensor bodies 38 of the sensors 16 and one of the magnetism converging members 48 located in a circumferentially and axially intermediate area between a circumferentially-adjacent pair of the teeth 22, it becomes possible to suppress increase in the axial size of the motor 10. Moreover, it becomes unnecessary to mount a sensor magnet, which is dedicated for detection of the rotation angle of the rotor 14, to the rotor 14; consequently, the parts count of the motor 10 can be reduced.

Moreover, in the present embodiment, the magnetism converging members 48 and the sensor bodies 38 of the sensors 16 are held by the corresponding sensor-holding portions 52 of the busbar 50. Consequently, it becomes possible to mount the busbar 50 to the insulator 32 after winding the winding 28 around the teeth 22 and then have the magnetism converging members 48 and the sensor bodies 38 of the sensors 16 held by the corresponding sensor-holding portions 52 of the busbar 50. That is, the magnetism converging members 48 and the sensor bodies 38 of the sensors 16 can be held without impeding the process of winding the winding 28 around the teeth 22.

In the present embodiment, the fixing portion 58 of the busbar 50 is fixed to the surface of the back-core covering portion 34 of the insulator 32 on the one side in the axial direction. Further, the circuit board 44 is fixed to the fixing portion 58 of the busbar 50. Consequently, it becomes possible to perform the assembly of the stator 12 in the space on only one axial side of the stator core 26.

In the present embodiment, the portions 56 of the sensor insertion holes 54 on the one side in the axial direction are formed to expand toward the one side in the axial direction. Consequently, even if the positions of the sensor bodies 38 of the sensors 16 mounted to the circuit board 44 are slightly deviated, the sensor bodies 38 of the sensors 16 can still be guided by the portions 56 of the corresponding sensor insertion holes 54 formed in the sensor-holding portions 52 of the busbar 50 to the closed end side in the corresponding sensor insertion holes 54 during insertion of the sensor bodies 38 of the sensors 16 into the corresponding sensor insertion holes 54.

Figure 14:
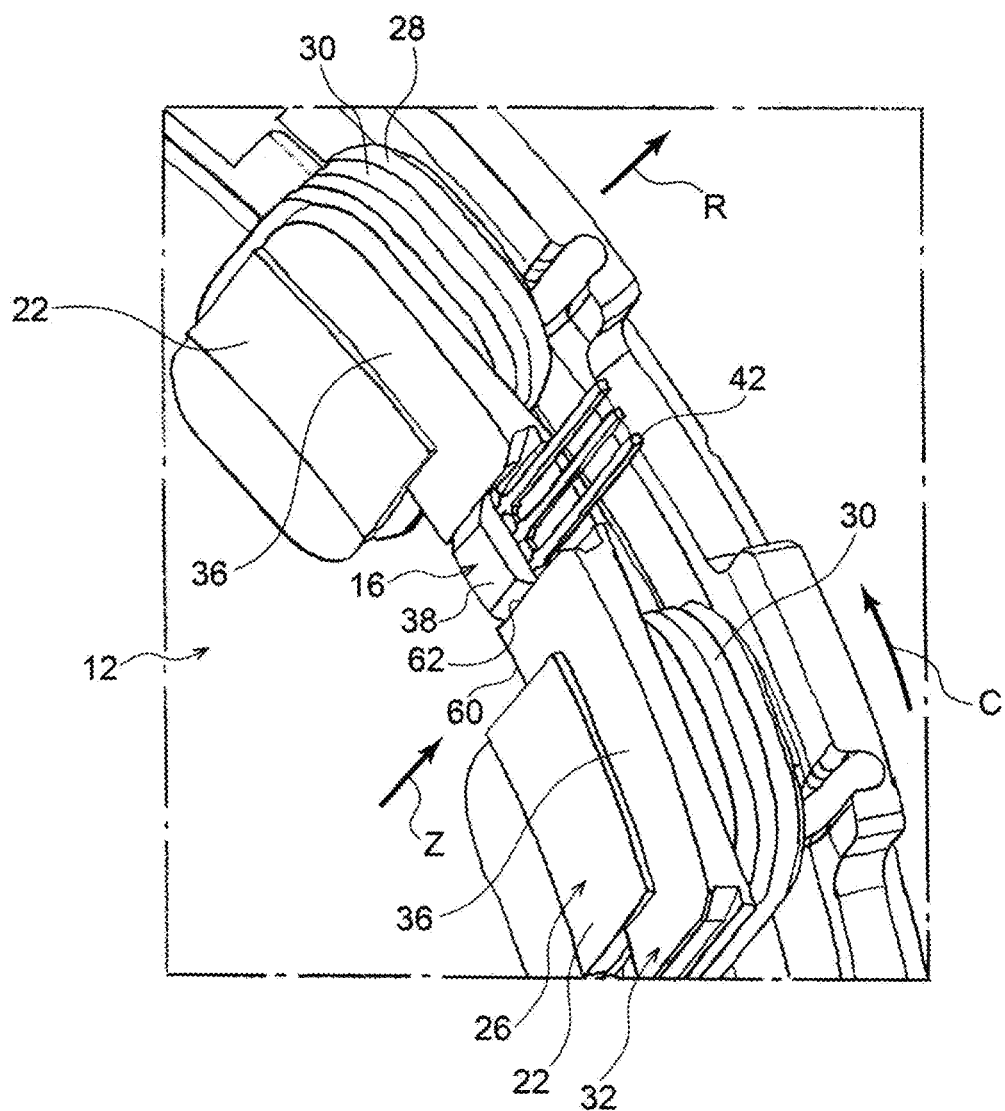
FIG. 14 is an enlarged perspective view showing a stator according to another embodiment.

In addition, in the present embodiment, an example has been described above in which the sensor bodies 38 of the sensors 16 are held by the busbar 50. However, the present disclosure is not limited to the above example. For example, as shown in FIG. 14, the sensor bodies 38 of the sensors 16 may alternatively be held by the insulator 32. In this case, the insulator 32 further has three connecting portions 60 each connecting, in the circumferential direction, those parts of the tooth covering portion 36 of the insulator 32 which respectively cover a circumferentially-adjacent pair of the teeth 22 on the one side in the axial direction. Moreover, in a circumferentially central part of each of the connecting portions 60, there is formed a holding groove 62 that opens on both axial sides and the radially inner side. The sensor bodies 38 of the sensors 16 are fitted respectively into the holding grooves 62 formed in the connecting portions 60 of the insulator 32 from one axial side of the holding grooves 62, thereby being held by insulator 32. With this configuration, it becomes unnecessary to employ the above-described busbar 50; consequently, it becomes possible to reduce the parts count of the motor 10 and simplify the assembly process of the motor 10. Moreover, no magnetism converging members 48 as described above are employed in this configuration. Therefore, in terms of suppressing decrease in the accuracy of detecting the magnetism of the magnets 20, it is preferable for the sensor bodies 38 of the sensors 16 to be located on the imaginary circle C1 (see FIG. 9A) that connects the radially inner ends of the teeth 22 in the circumferential direction. However, it should be noted that the sensor bodies 38 of the sensors 16 may alternatively be located slightly radially outside the imaginary circle C1.

Second Embodiment

Next, a motor 70 according to the second embodiment of the present disclosure will be described. It should be noted that in the motor 70 according to the second embodiment, members and portions corresponding to those in the motor 10 according to the first embodiment are designated by the same reference numerals as the corresponding members and portions in the motor 10 and explanation thereof will be omitted hereinafter.

Figure 15:
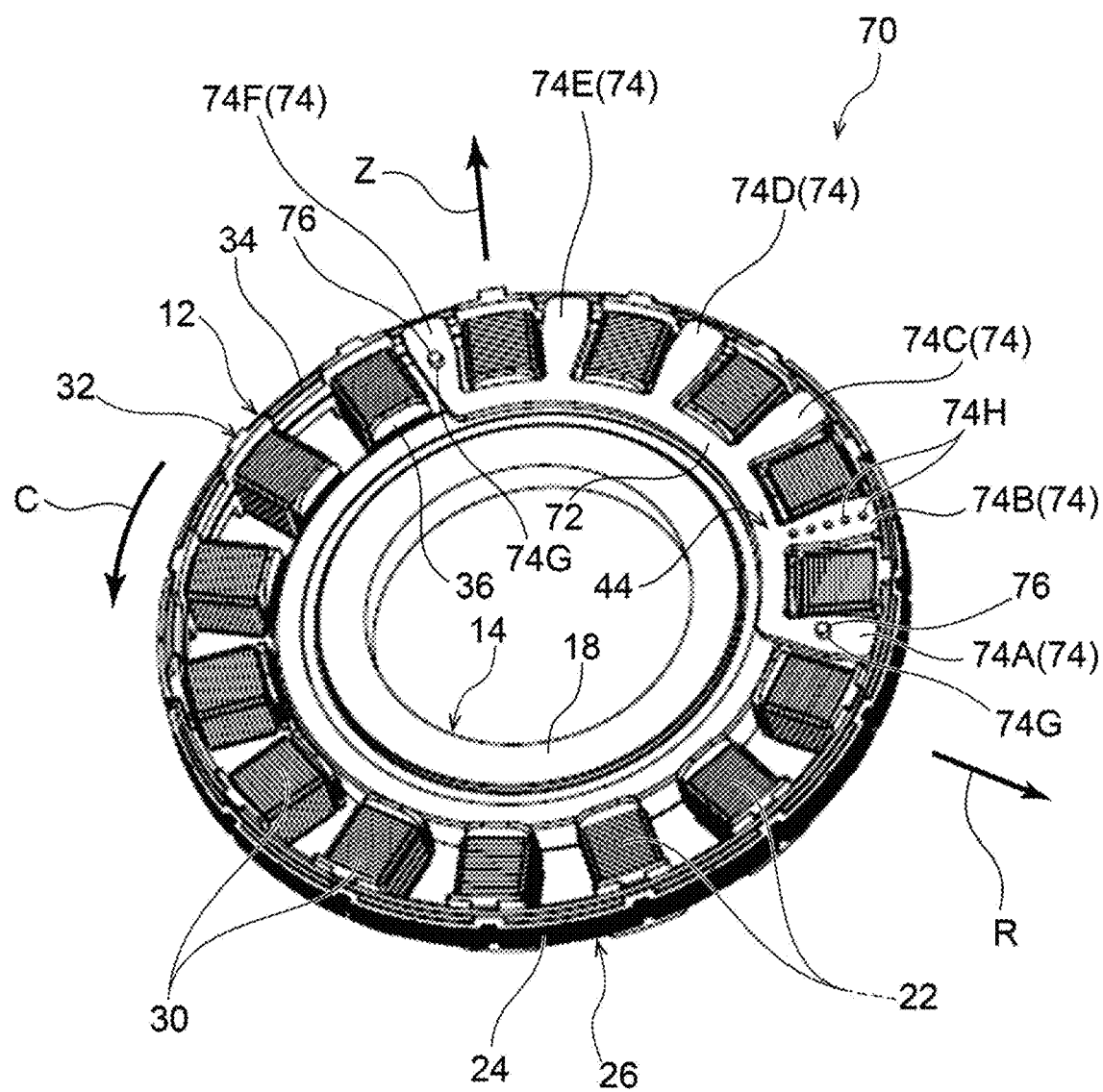
FIG. 15 is a perspective view, from a circuit board side, of a stator, a rotor and the like which together constitute a motor according to a second embodiment.
Figure 16:
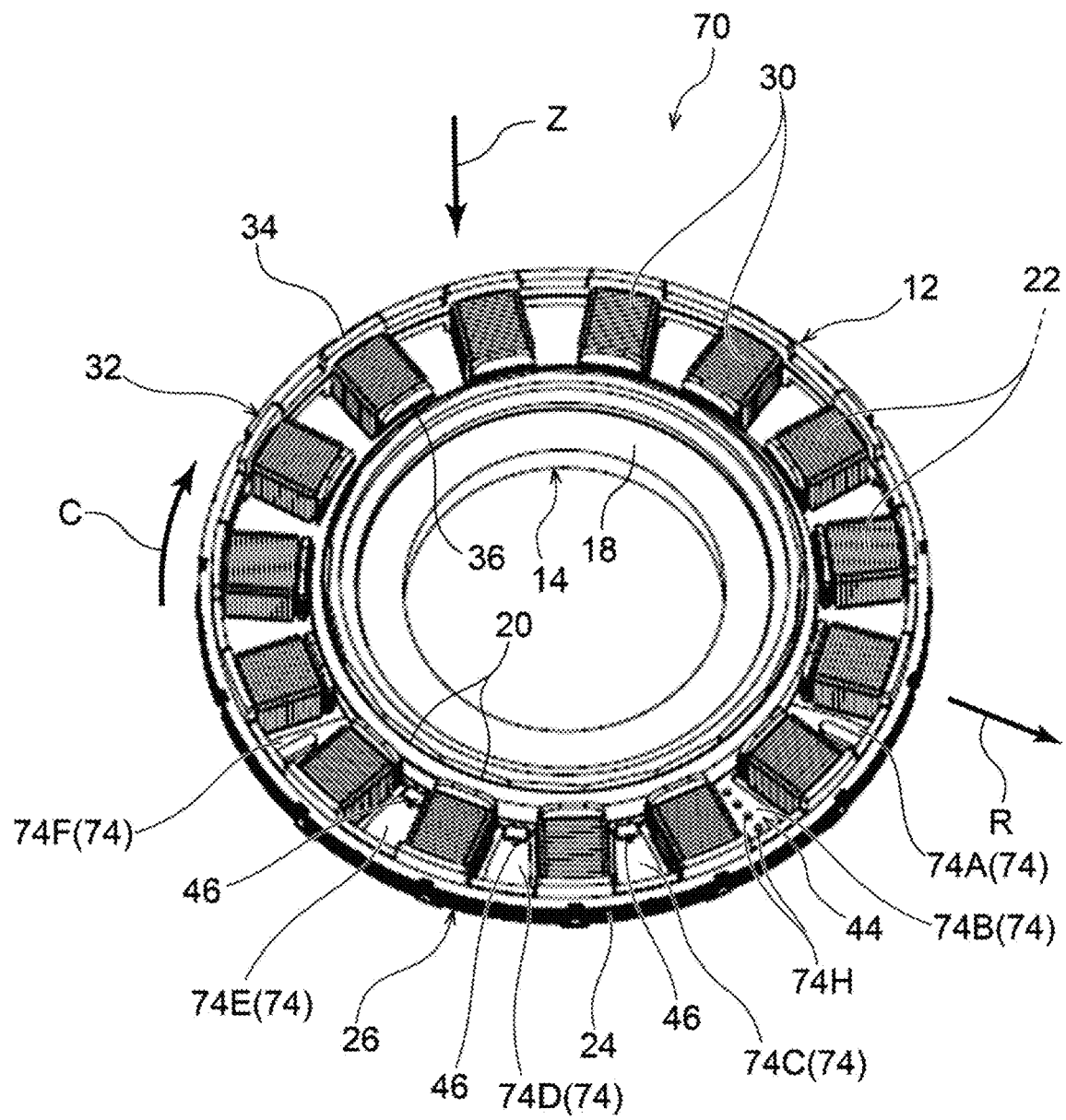
FIG. 16 is a perspective view, from the opposite side to the circuit board, of the stator, the rotor and the like which together constitute the motor according to the second embodiment.
Figure 17:
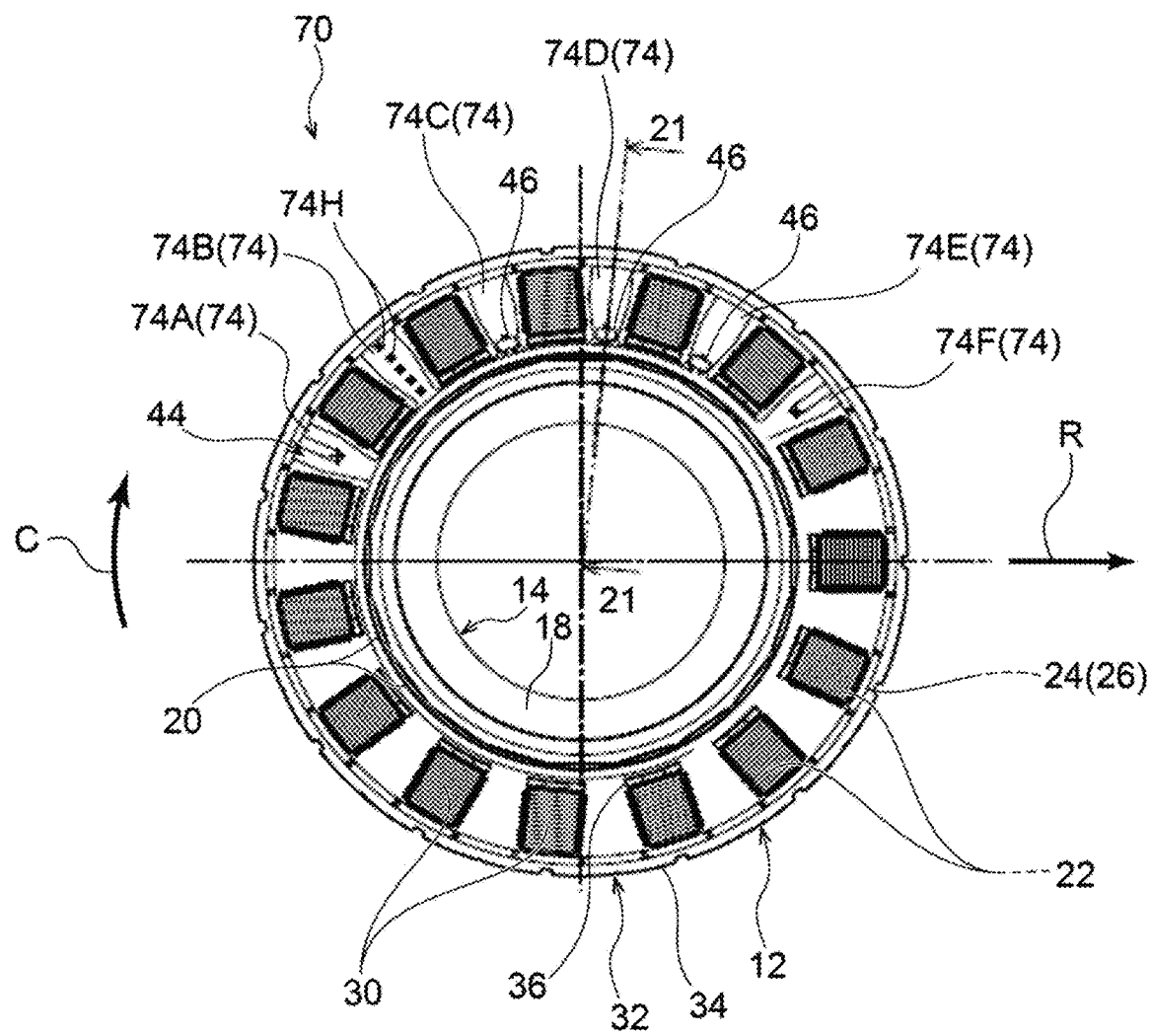
FIG. 17 is a bottom view, from the opposite side to the circuit board, of the stator, the rotor and the like which together constitute the motor according to the second embodiment.

As shown in FIGS. 15, 16 and 17, in the motor 70 according to the present embodiment, the circuit board 44 is shaped such that the coil 30 wound around each of the teeth 22 of the stator core 26 is visible when the circuit board 44 is viewed along the axial direction. Consequently, the circuit board 44 does not overlap the coil ends of the coil 30 in the axial direction.

Figure 18:
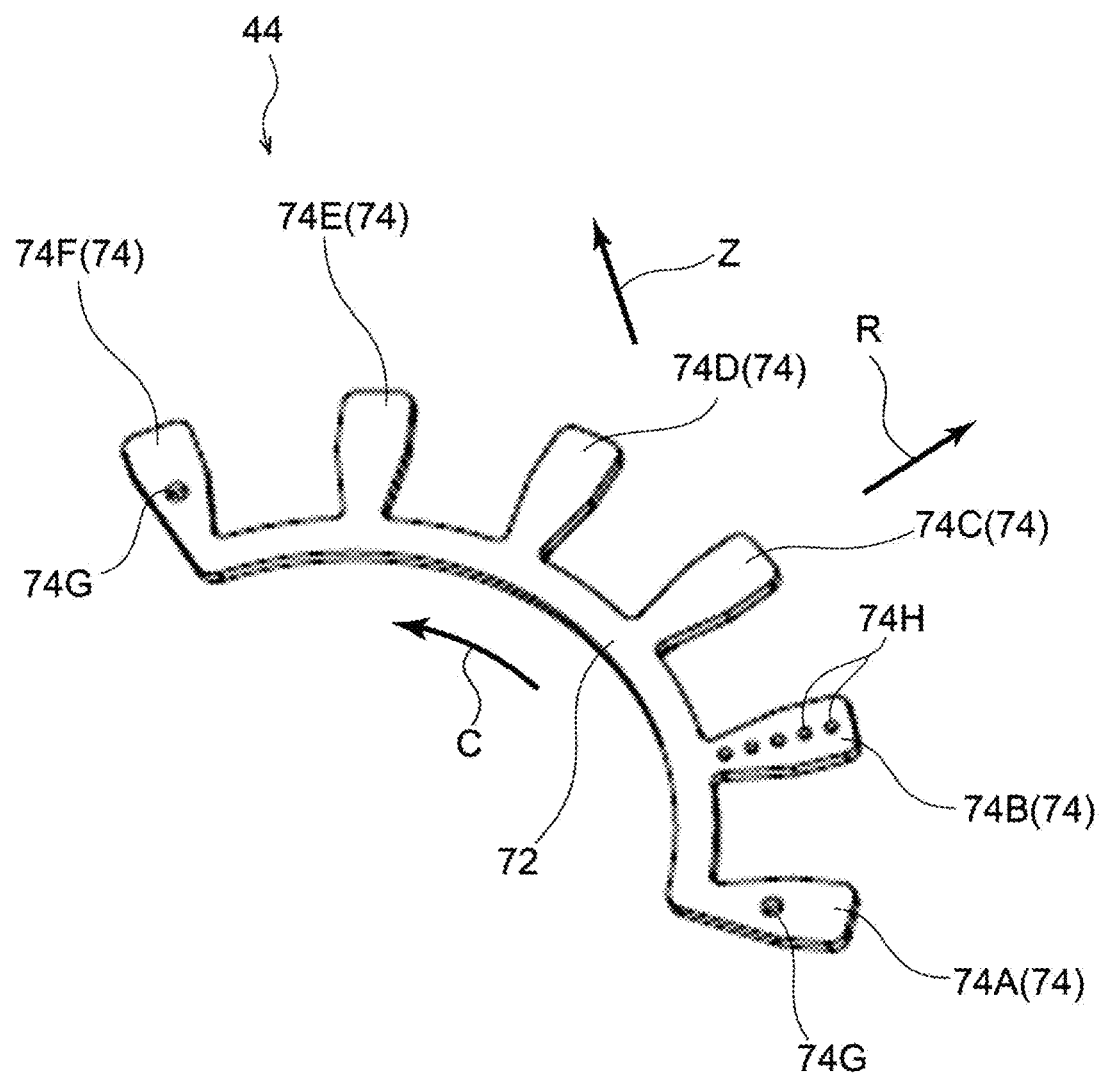
FIG. 18 is a perspective view of the circuit board from the opposite side to a surface thereof on which sensors are mounted.
Figure 19:
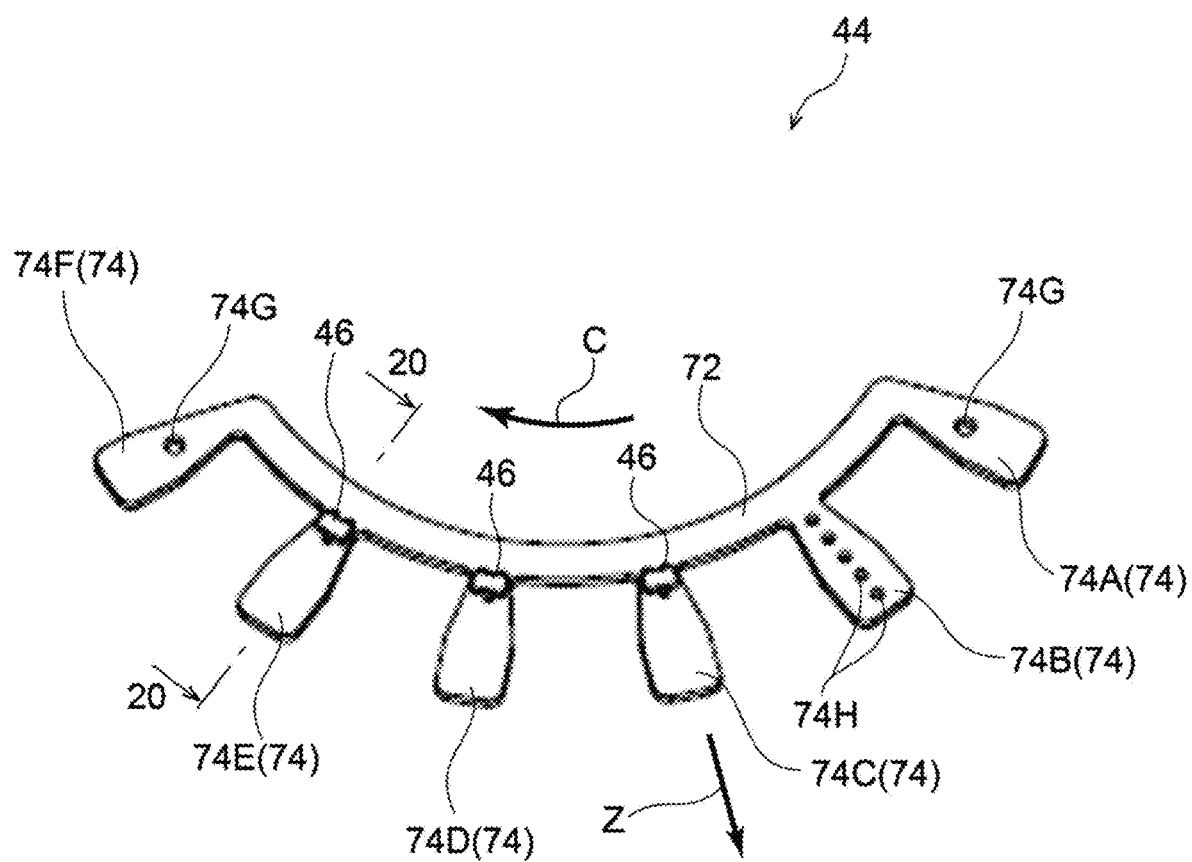
FIG. 19 is a perspective view of the circuit board from the side of the surface thereof on which the sensors are mounted.

Specifically, as shown in FIGS. 15, 18 and 19, the circuit board 44 has a first extending portion 72 that extends along the radially inner ends of the teeth 22 of the stator core 26 and a plurality of second extending portions 74 that each extend radially outward from the first extending portion 72 and are arranged at equal intervals in the circumferential direction. The first extending portion 72 is formed in a substantially U-shape such that the radially outer and radially inner ends of the first extending portion 72 are arc-shaped and the radial width of the first extending portion 72 is constant along the circumferential direction. In the present embodiment, the circuit board 44 has six second extending portions 74. The outer edges of the six second extending portions 74 are formed to be identical in shape to each other. More specifically, radially inner parts of the second extending portions 74 are formed in a substantially trapezoidal shape such that the circumferential dimension of the radially inner parts gradually increase in a radially outward direction. On the other hand, radially outer parts of the second extending portions 74 are formed in a substantially square shape such that the circumferential dimension of the radially outer parts is kept substantially constant in the radially outward direction.

Figure 20:
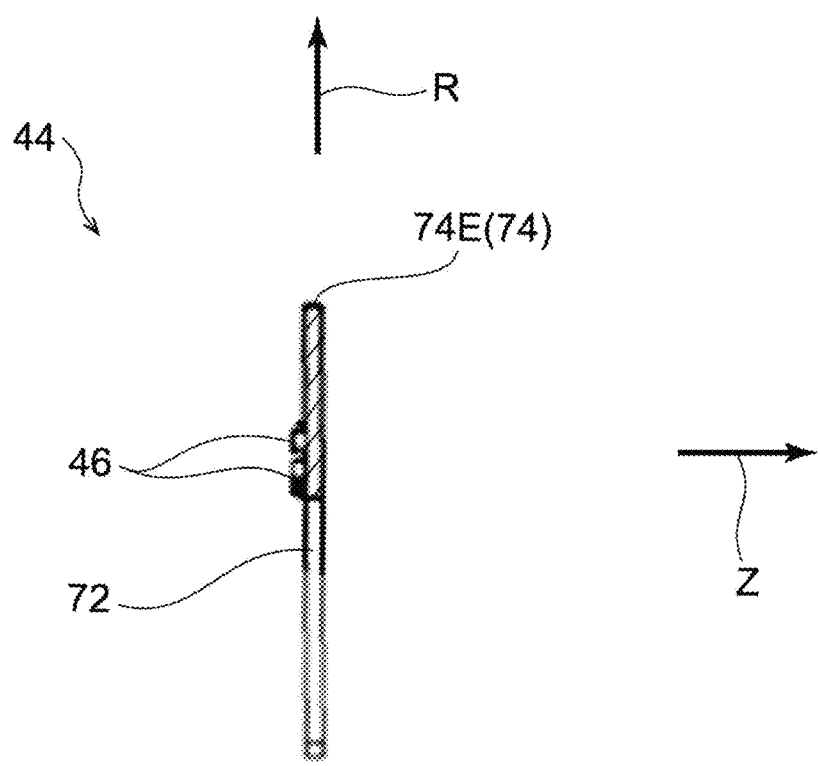
Figure 21:
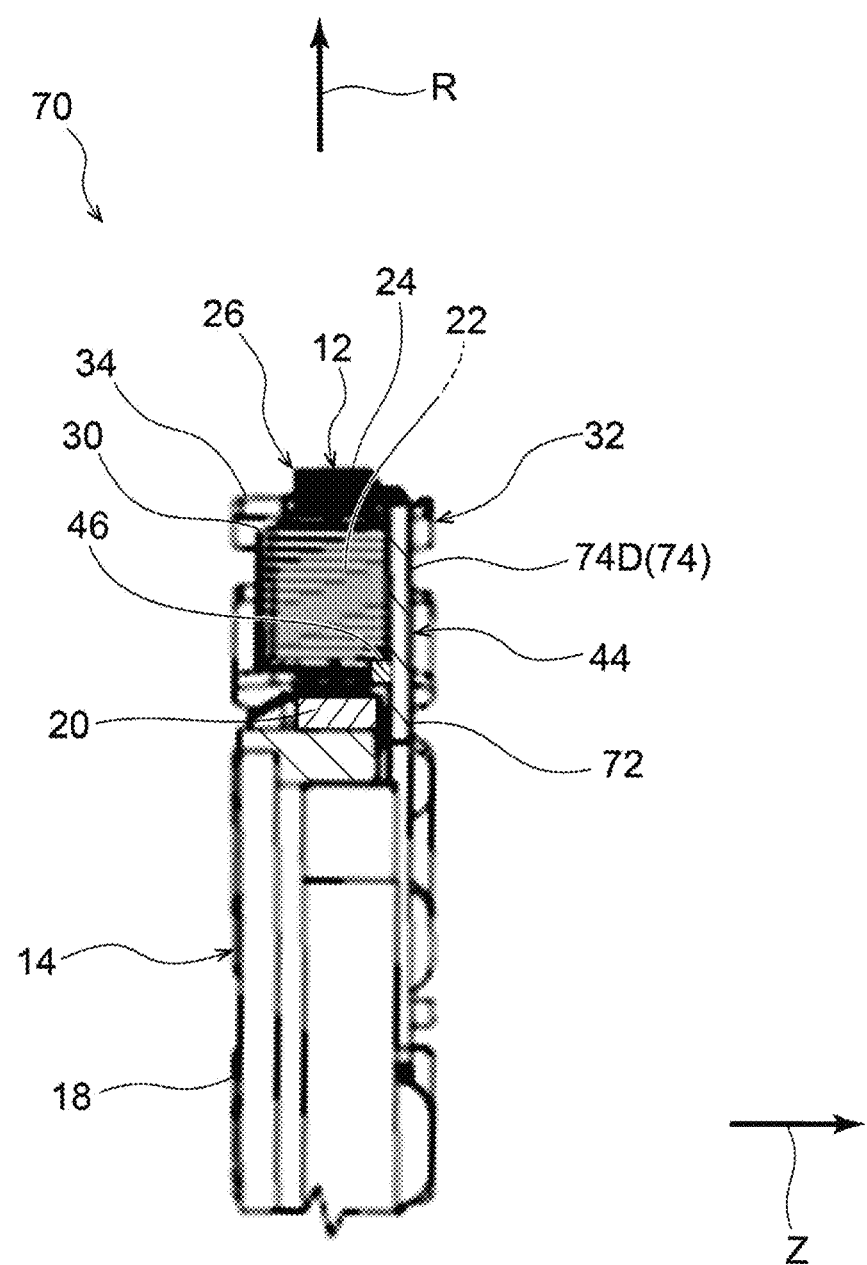

Hereinafter, the six second extending portions 74 will be sequentially referred to as the second extending portion 74A, the second extending portion 74B, the second extending portion 74C, the second extending portion 74D, the second extending portion 74E and the second extending portion 74F from one side to the other side in the circumferential direction. In radially and circumferentially central parts of the second extending portions 74A and 74F, there are formed fixing holes 74G into which fixing protrusions 76 formed in the insulator 32 are respectively inserted. In addition, the circuit board 44 is fixed to the insulator 32 by heat-staking the fixing protrusions 76. On the other hand, in a circumferentially central part of the second extending portion 74B, there are formed a plurality of terminal insertion holes 74H at intervals in the radial direction to have a plurality of terminals (not shown in the drawings) respectively inserted therein. As shown in FIGS. 19 and 20, to circumferentially central parts of radially inner end portions of the surfaces of the second extending portions 74C, 74D and 74E on the other side in the axial direction, there are respectively mounted three mount-type sensors 46. Moreover, as shown in FIG. 15, in a state of the circuit board 44 having been fixed to the insulator 32, each of the second extending portions 74 is located in a circumferentially intermediate area between a circumferentially-adjacent pair of the teeth 22 in an axial view from the one side. Further, as shown in FIG. 21, in the state of the circuit board 44 having been fixed to the insulator 32, each of the second extending portions 74 circumferentially overlaps the coil end of the coil 30 on the one side in the axial direction. Furthermore, as shown in FIGS. 16 and 21, in the state of the circuit board 44 having been fixed to the insulator 32, each of the sensors 46 mounted respectively to the second extending portions 74C, 74D and 74E is located between a circumferentially central area between a circumferentially-adjacent pair of the teeth 22 in an axial view from the other side. In addition, in the state of the circuit board 44 having been fixed to the insulator 32, each of the sensors 46 mounted respectively to the second extending portions 74C, 74D and 74E is located in close proximity to ends of the magnets 20 of the rotor 14 on the one side in the axial direction.

As described above, in the motor 70 according to the present embodiment, the circuit board 44 is shaped such that the coil 30 wound around each of the teeth 22 of the stator core 26 is visible when the circuit board 44 is viewed along the axial direction. Consequently, it becomes possible to prevent heat dissipation of the coil 30 from being impeded by the circuit board 44.

Moreover, in the motor 70 according to the present embodiment, in the state of the circuit board 44 having been fixed to the insulator 32, each of the second extending portions 74 circumferentially overlaps the coil end of the coil 30 on the one side in the axial direction. Consequently, it becomes possible to prevent the circuit board 44 from protruding from the coil 30 to the one side in the axial direction, thereby suppressing increase in the axial dimension of the motor 70.

Third Embodiment

Next, a motor 78 according to the third embodiment of the present disclosure will be described. It should be noted that in the motor 78 according to the third embodiment, members and portions corresponding to those in the above-described motors 10 and 70 are designated by the same reference numerals as the corresponding members and portions in the motors 10 and 70 and explanation thereof will be omitted hereinafter.

Figure 22:
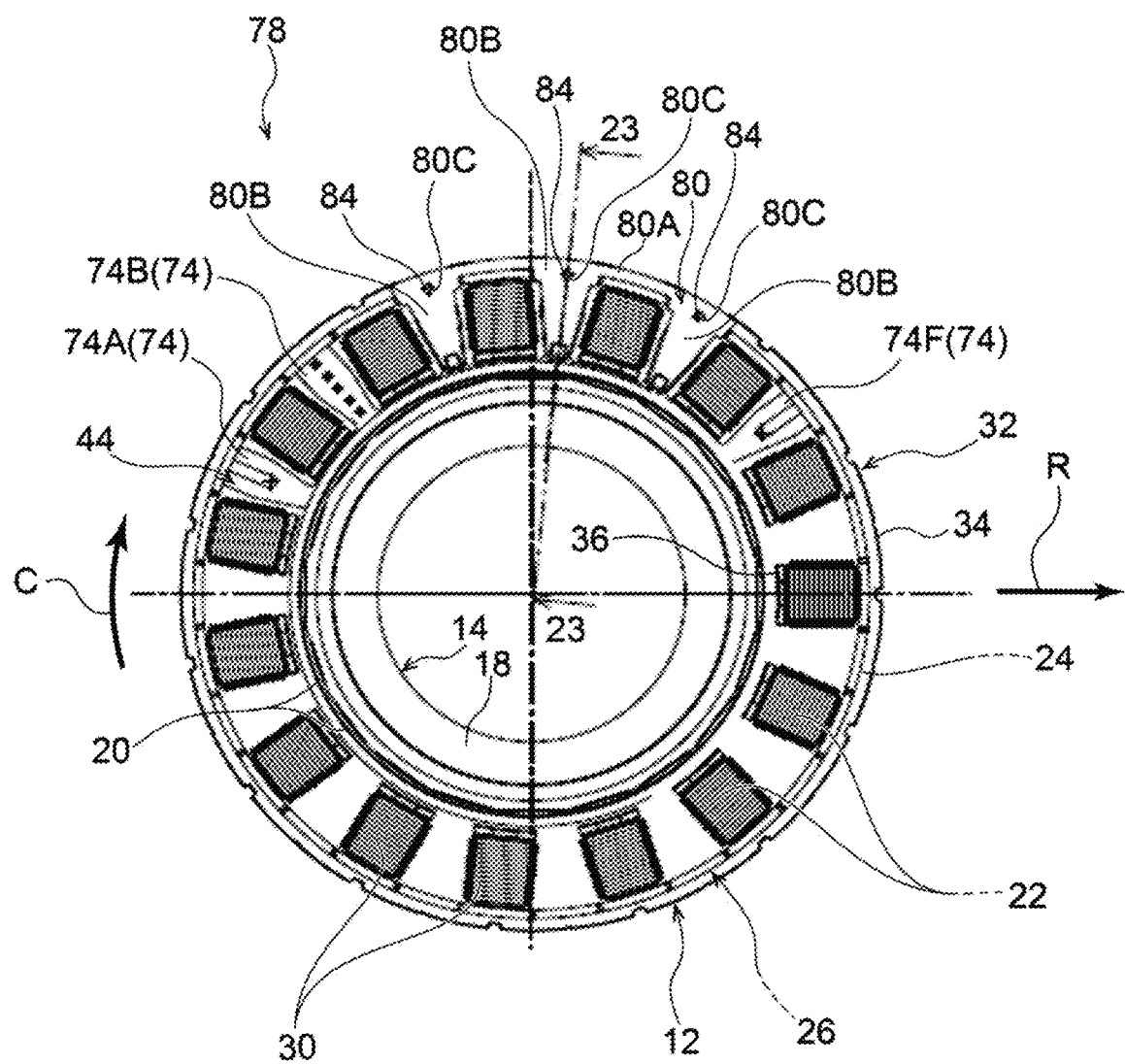
FIG. 22 is a bottom view, from the opposite side to a circuit board, of a stator, a rotor and the like which together constitute a motor according to a third embodiment.
Figure 23:
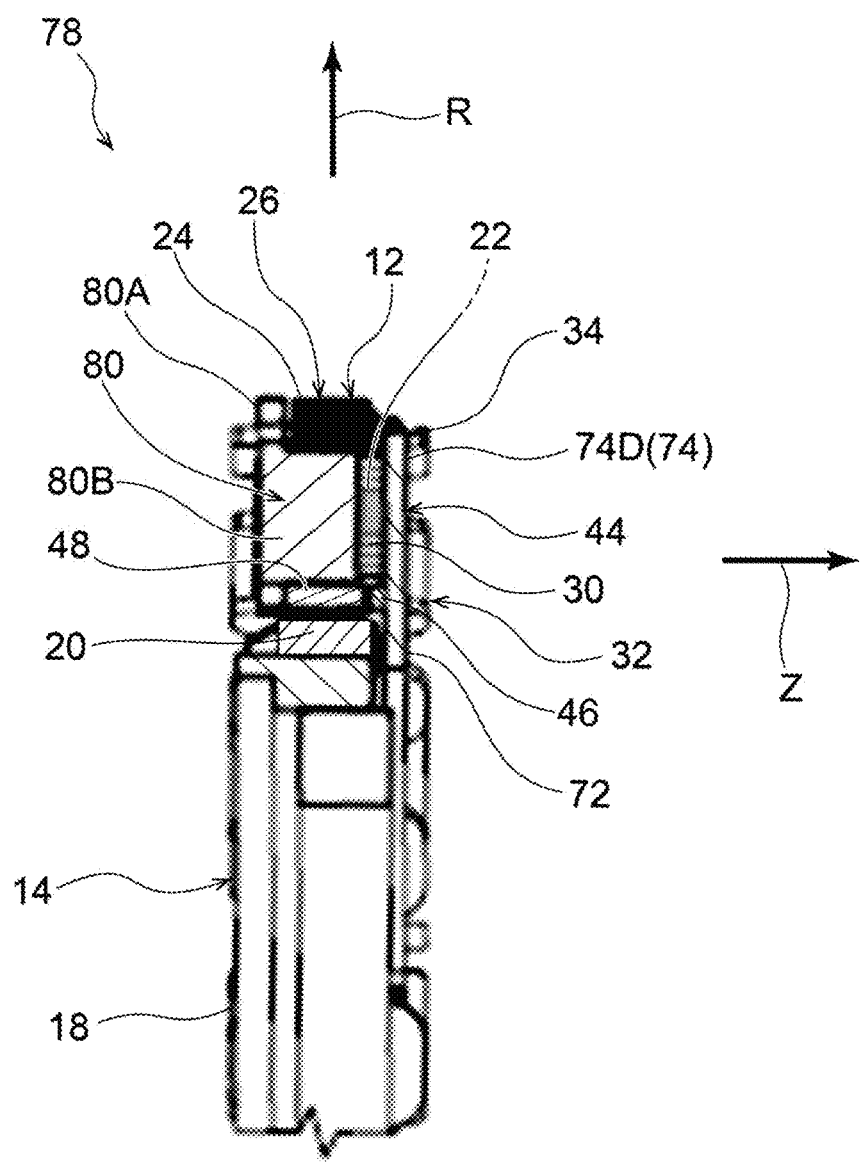

As shown in FIGS. 22 and 23, compared to the motor 70 according to the second embodiment, the motor 78 according to the present embodiment further includes three magnetism converging members 48 and a support member 80 that supports the three magnetism converging members 48.

The three magnetism converging members 48 are formed in a rectangular solid shape with its longitudinal direction coinciding with the axial direction. It should be noted that the three magnetism converging members 48 may alternatively be formed in a cylindrical shape or a columnar shape extending in the axial direction.

Similar to the insulator 32, the support member 80 is formed of an electrically-insulative material such as a resin material. Specifically, the support member 80 has a plate-shaped outer peripheral portion 80A extending along the surface of the back-core covering portion 34 of the insulator 32 on the other side in the axial direction and three block-shaped support portions 80B extending from the outer peripheral portion 80A radially inward and arranged at equal intervals in the circumferential direction. In the outer peripheral portion 80A, there are formed fixing holes 80C into which fixing protrusions 84 formed in the insulator 32 are respectively inserted. In addition, the support member 80 is fixed to the insulator 32 by heat-staking the fixing protrusions 84. Each of the support portions 80B is formed in a prismatic shape such that both axial end faces thereof are trapezoidal-shaped. The axial dimension of the support portions 80B is set to be larger than the axial dimension of the outer peripheral portion 80A. Moreover, the surfaces of the support portions 80B on the other side in the axial direction is substantially flush with the surface of the outer peripheral portion 80A on the other side in the axial direction. The three magnetism converging members 48 are respectively supported by radially inner end portions of the three support portions 80B.

In a state of the support member 80 having been fixed to the insulator 32 so as to axially face the circuit board 44, each of the three support portions 80B is located in a circumferentially intermediate area between a circumferentially-adjacent pair of the teeth 22 in an axial view from the other side. Consequently, the three magnetism converging members 48 supported respectively by the three support portions 80B of the support member 80 are axially located in close proximity respectively to the three sensors 46 mounted to the circuit board 44 and radially located in close proximity to the magnets 20 of the rotor 14.

As described above, in the motor 78 according to the present embodiment, the magnetism of the magnets 20 of the rotor 14 can be guided to the three sensors 46 respectively via the three magnetism converging members 48. Consequently, it becomes possible to suppress variation in the detection of change in the magnetism of the magnets 20 by the sensors 46.

Moreover, with the configuration where the support member 80 supporting the three magnetism converging members 48 is fixed to the insulator 32, it becomes possible to facilitate the positioning of the three magnetism converging members 48 with respect to the three sensors 46.

Fourth Embodiment

Next, a motor 86 according to the fourth embodiment of the present disclosure will be described. It should be noted that in the motor 86 according to the fourth embodiment, members and portions corresponding to those in the above-described motors 10, 70 and 78 are designated by the same reference numerals as the corresponding members and portions in the motors 10, 70 and 78 and explanation thereof will be omitted hereinafter.

Figure 24:
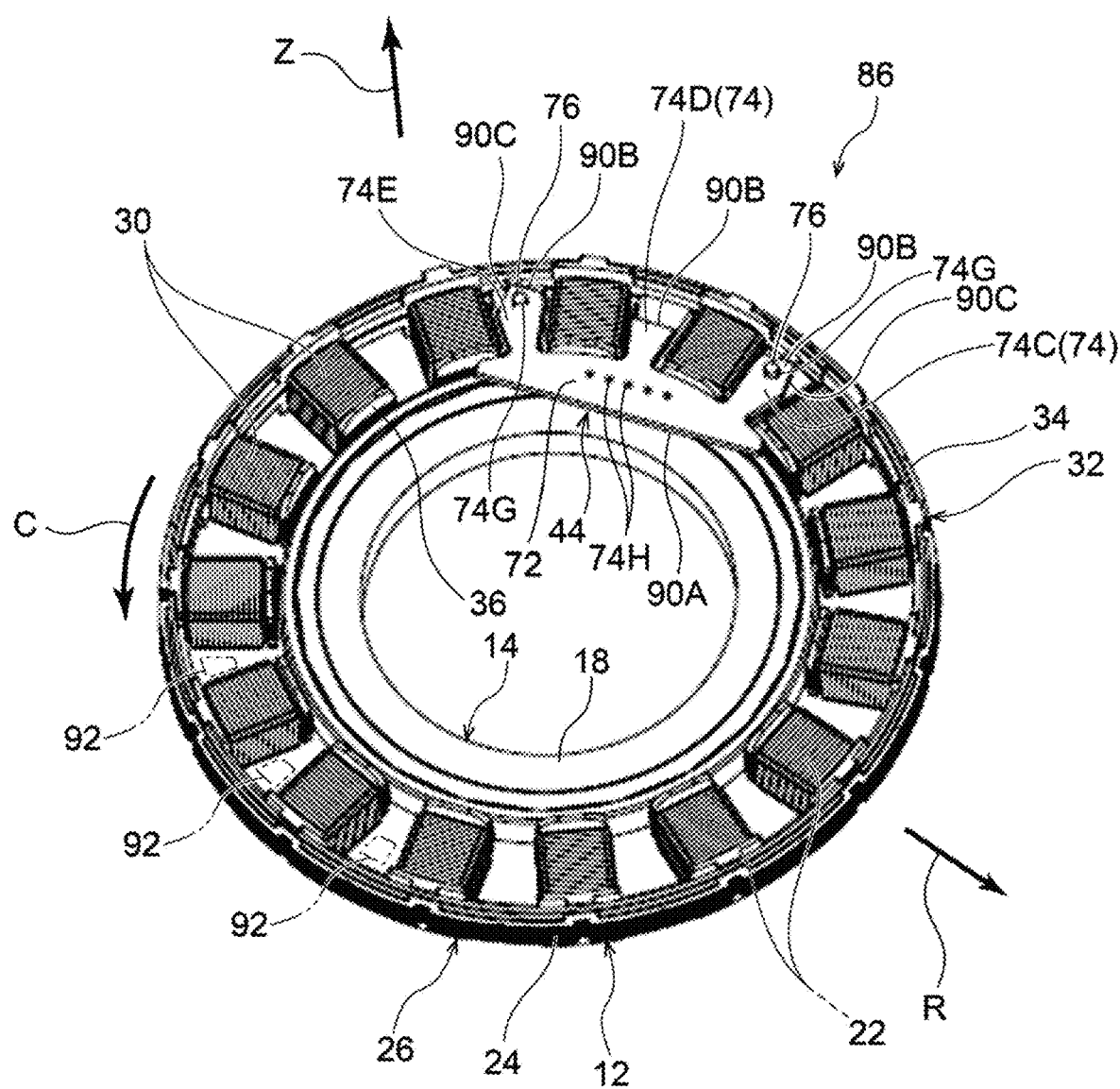
FIG. 24 is a perspective view, from a circuit board side, of a stator, a rotor and the like which together constitute a motor according to a fourth embodiment.
Figure 25:
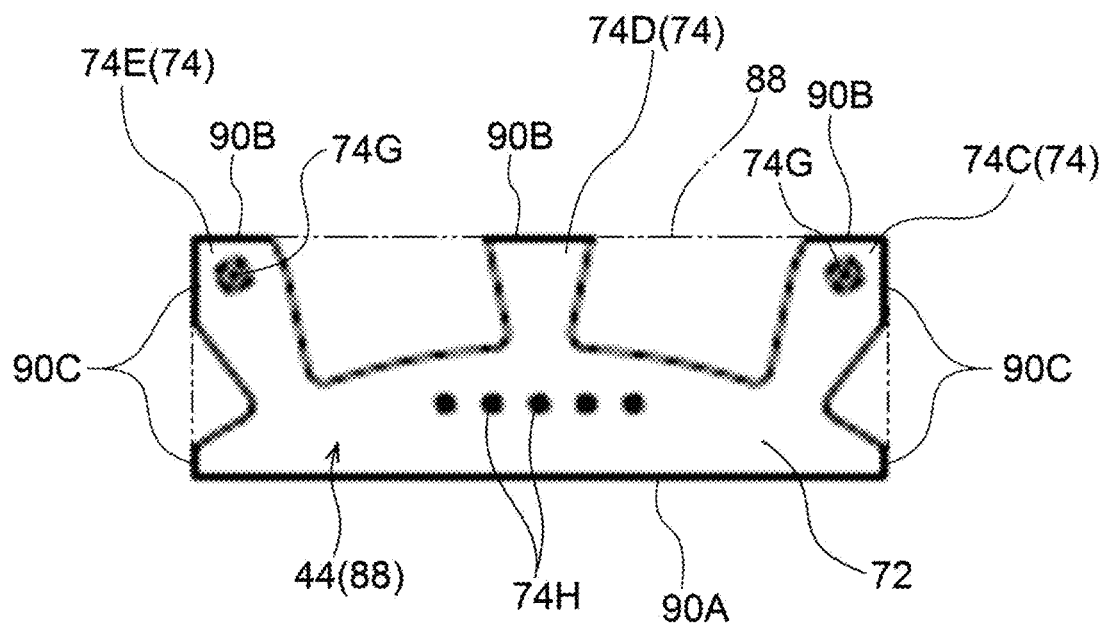
FIG. 25 is a plan view of the circuit board from the opposite side to a surface thereof on which sensors are mounted.
Figure 26:
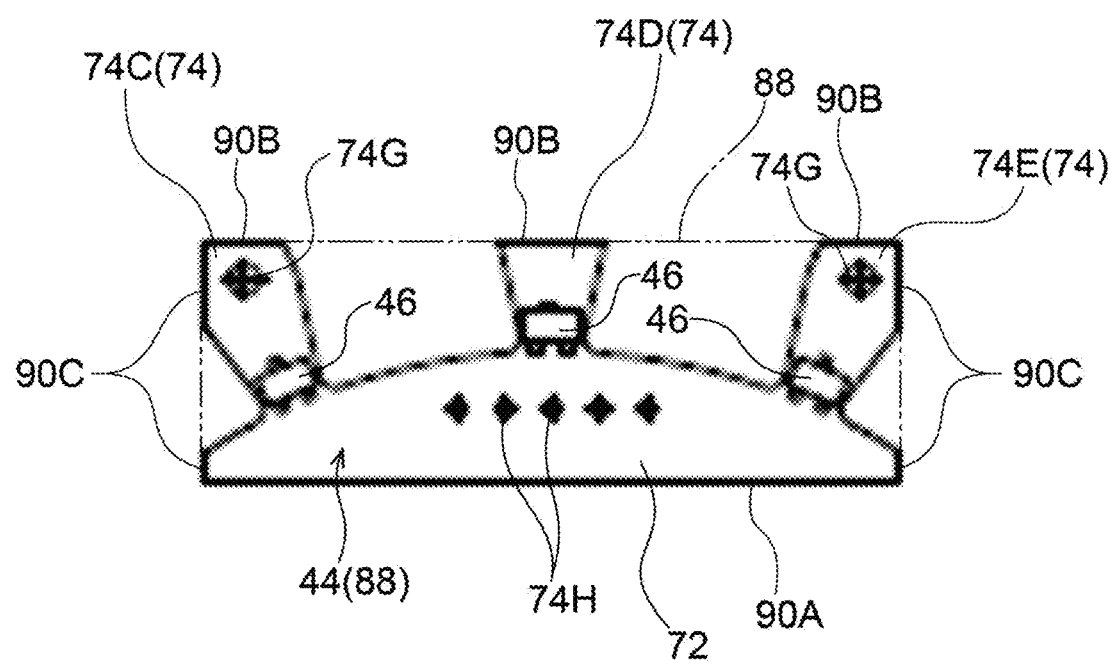
FIG. 26 is a bottom view of the circuit board from the side of the surface thereof on which the sensors are mounted.

As shown in FIGS. 24, 25 and 26, in the motor 86 according to the present embodiment, the circuit board 44 is formed by cutting and removing part of a rectangular plate-shaped board-constituting member 88. After the circuit board 44 is fixed to the insulator 32, an end 90A of the first extending portion 72 on the opposite side to the second extending portions 74 has the shape of a straight line perpendicular to the radial direction when viewed along the axial direction. Moreover, ends 90B of the second extending portions 74 on the opposite side to the first extending portion 72 also have the shape of a straight line perpendicular to the radial direction when viewed along the axial direction. Furthermore, circumferential ends 90C of the first extending portion 72 and the second extending portions 74, which are circumferentially located outermost in the circuit board 44, have the shape of a straight line parallel to the radial direction.

In addition, in spaces between circumferentially-adjacent teeth 22 different from those where the second extending portions 74 of the circuit board 44 are arranged, there are provided connection portions 92 to which power lines (not shown in the drawings) are connected.

As described above, in the motor 86 according to the present embodiment, the circuit board 44 is formed by cutting and removing part of the rectangular plate-shaped board-constituting member 88. Consequently, compared to the motor 70 according to the second embodiment, the amount of removal of the board-constituting member 88, which constitutes the circuit board 44, can be reduced. That is, the yield rate of the board-constituting member 88 that constitutes the circuit board 44 can be improved. In addition, it is possible to improve the yield rate of the board-constituting member 88 that constitutes the circuit board 44 by forming at least one of the ends 90A, 90B and 90C of the circuit board 44 in a straight-line shape.

Fifth Embodiment

Next, a motor 94 according to the fifth embodiment of the present disclosure will be described. It should be noted that in the motor 94 according to the fifth embodiment, members and portions corresponding to those in the above-described motors 10, 70, 78 and 86 are designated by the same reference numerals as the corresponding members and portions in the motors 10, 70, 78 and 86 and explanation thereof will be omitted hereinafter.

Figure 27:
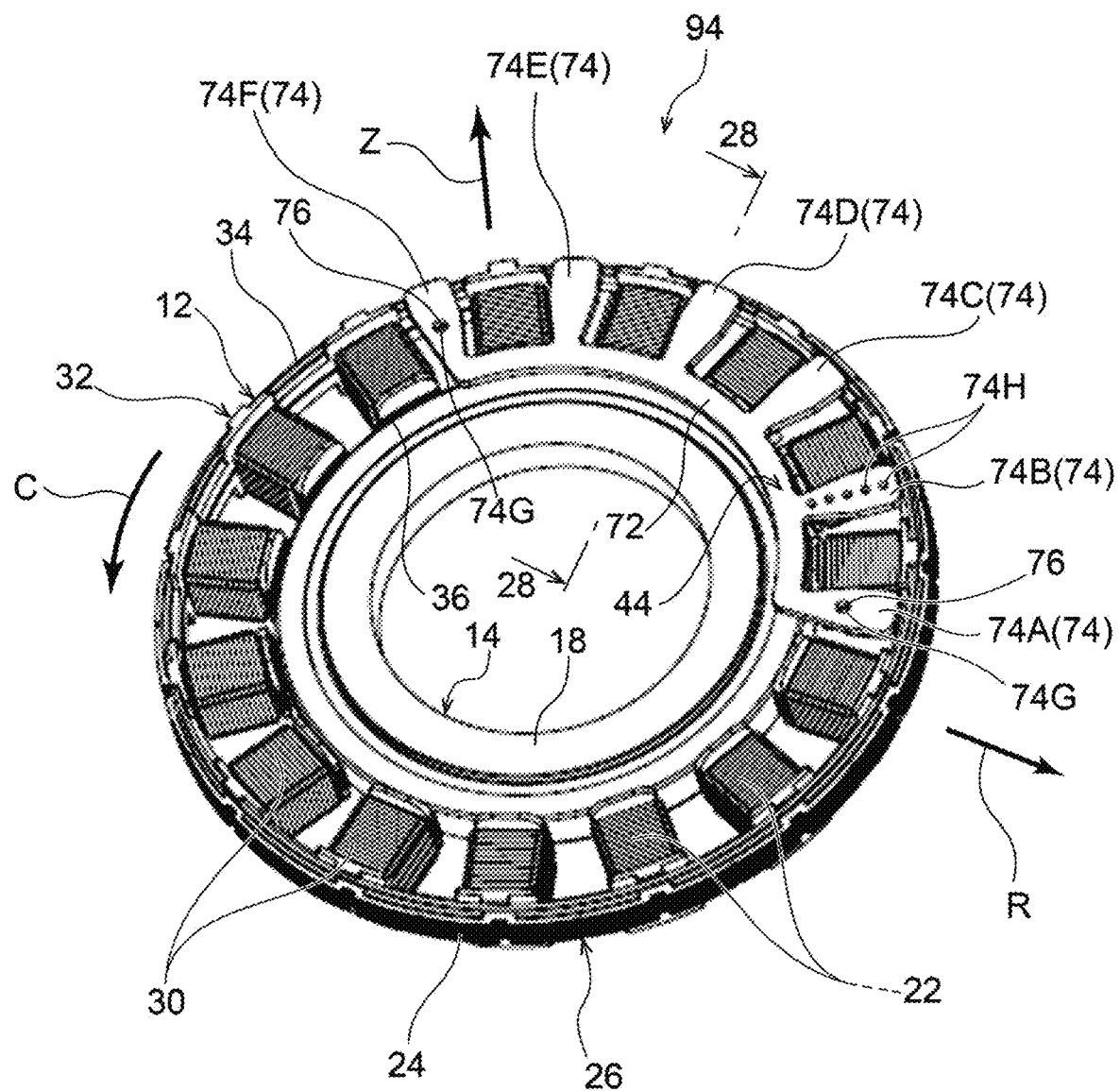
FIG. 27 is a perspective view, from a circuit board side, of a stator, a rotor and the like which together constitute a motor according to a fifth embodiment.
Figure 28:
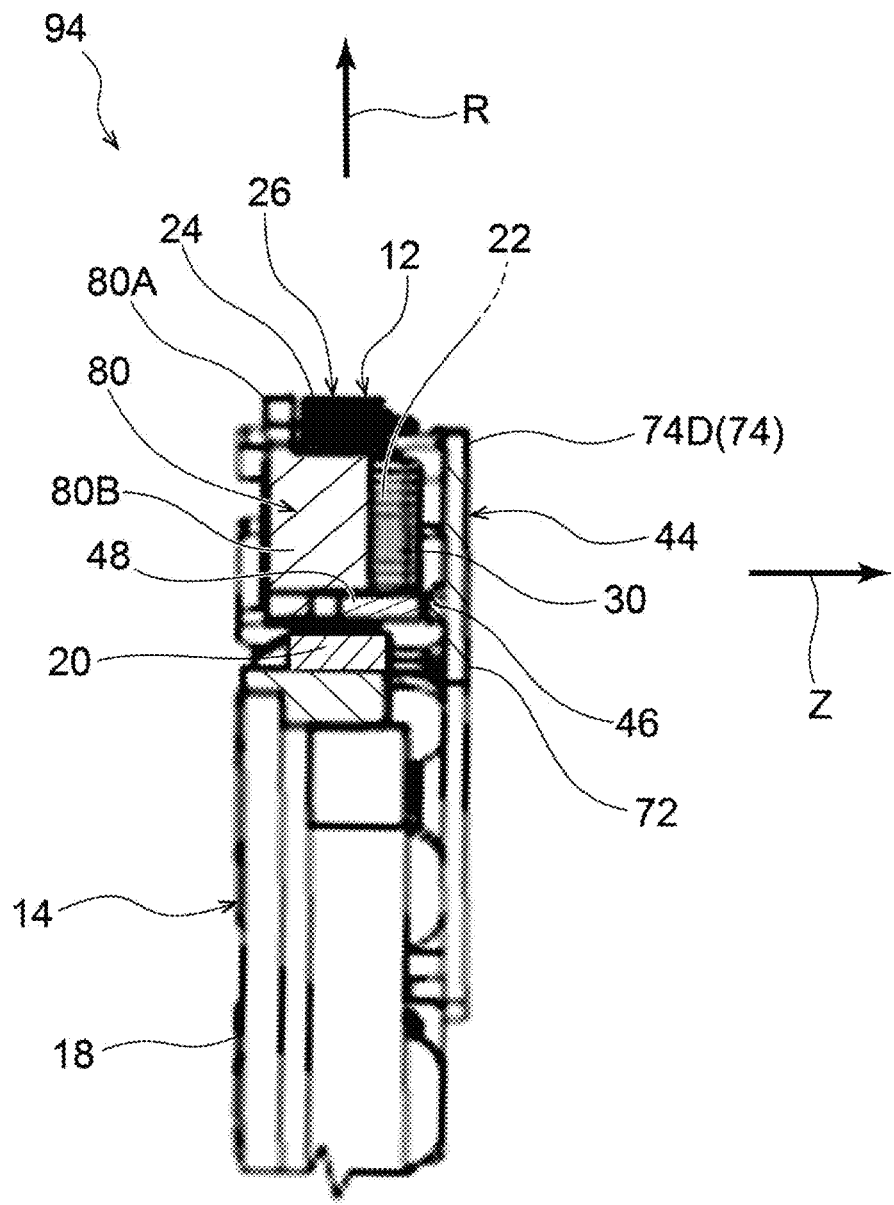

As shown in FIGS. 27 and 28, in the motor 94 according to the present embodiment, the circuit board 44 is fixed, at a position offset to the one side in the axial direction with respect to that in the motor 78 according to the third embodiment, to the insulator 32. Consequently, the three sensors 46 mounted to the circuit board 44 are located on the one side in the axial direction with respect to the coil end of the coil 30. Moreover, in the motor 94 according to the present embodiment, the three magnetism converging members 48 are supported by the support member 80 at positions offset to the one side in the axial direction with respect to those in the motor 78 according to the third embodiment so as to correspond the positions of the three sensors 46 mounted to the circuit board 44.

As described above, in the motor 94 according to the present embodiment, even with the configuration where the three sensors 46 mounted to the circuit board 44 are located on the one side in the axial direction with respect to the coil end of the coil 30, it is still possible to guide the magnetism of the magnets 20 of the rotor 14 to the three sensors 46 via the three magnetism converging members 48. Consequently, it is possible to suppress variation in the detection of change in the magnetism of the magnets 20 by the sensors 16.

The above-described configurations of the motors according to the present disclosure can also be applied to motors where the magnets 20 of the rotor 16 are arranged radially outside the stator core 26.

While the above particular embodiments of the present disclosure have been shown and described, it will be understood by those skilled in the art that the present disclosure is not limited to the above particular embodiments, but may be carried out through various modifications without departing from the spirit of the present disclosure.

Moreover, while the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:

1. A motor comprising:
a stator including a stator core and a coil, the stator core having a plurality of teeth arranged at intervals in a circumferential direction, the coil being formed of an electrically-conductive winding wound around the teeth;
a rotor having magnets arranged in radial opposition to the stator core and at intervals in the circumferential direction, the rotor being configured to rotate upon supply of electric current to the coil; and
a sensor arranged in a circumferentially intermediate area between a circumferentially-adjacent pair of the teeth in an axial view, the sensor being configured to detect magnetism of the magnets, wherein:
the sensor is mounted to a circuit board that radially extends so that a thickness direction of the circuit board coincides with an axial direction;
the circuit board is shaped such that the coil wound around the teeth of the stator core is visible when the circuit board is viewed along the axial direction; and
the circuit board is arranged to face at least part of the coil in the circumferential direction.

2. The motor as set forth in claim 1, wherein
the sensor is arranged in an axially intermediate area between the circumferentially-adjacent pair of the teeth.

3. The motor as set forth in claim 1, wherein
a magnetism converging member for converging the magnetism of the magnets is provided in close proximity to the sensor, and a support member, which supports the magnetism converging member, is fixed at a position facing the circuit board in the axial direction.

4. The motor as set forth in claim 1, wherein
the rotor is arranged radially inside the stator; and
the sensor is arranged on or radially outside an imaginary circle that connects radially inner ends of the teeth in the circumferential direction.

5. The motor as set forth in claim 1, wherein
on a rotor side of the sensor, a magnetism converging member is provided in close proximity to the sensor to converge the magnetism of the magnets.

6. The motor as set forth in claim 5, wherein
the rotor is arranged radially inside the stator;
the sensor is arranged radially outside an imaginary circle that connects radially inner ends of the teeth in the circumferential direction, and
the magnetism converging member is arranged on or radially outside the imaginary circle.

7. The motor as set forth in claim 5, wherein
circumferential and axial dimensions of the magnetism converging member are set so that when viewed along a radial direction, the magnetism converging member covers a sensing point, which senses the magnetism of the magnets, of the sensor.

8. A motor comprising:
a stator including a stator core and a coil, the stator core having a plurality of teeth arranged at intervals in a circumferential direction, the coil being formed of an electrically-conductive winding wound around the teeth;
a rotor having magnets arranged in radial opposition to the stator core and at intervals in the circumferential direction, the rotor being configured to rotate upon supply of electric current to the coil; and
a sensor arranged in a circumferentially intermediate area between a circumferentially-adjacent pair of the teeth in an axial view, the sensor being configured to detect magnetism of the magnets, wherein:
the sensor is mounted to a circuit board that radially extends so that a thickness direction of the circuit board coincides with an axial direction;
the circuit board is shaped such that the coil wound around the teeth of the stator core is visible when the circuit board is viewed along the axial direction;
the circuit board has (i) a first extending portion that extends along radial ends of the teeth and (ii) a second extending portion that extends from the first extending portion and into the circumferentially intermediate area between the circumferentially-adjacent pair of the teeth without overlapping the circumferentially-adjacent pair of the teeth and without being circumferentially connected with other portions of the circuit board; and
the second extending portion has the sensor mounted thereto.

9. The motor as set forth in claim 8, wherein
the sensor is arranged in an axially intermediate area between the circumferentially-adjacent pair of the teeth.

10. The motor as set forth in claim 8, wherein
at least one of ends of the first and second extending portions is formed to have a straight-line shape when viewed along the axial direction.

11. The motor as set forth in claim 8, wherein
a magnetism converging member for converging the magnetism of the magnets is provided in close proximity to the sensor, and a support member, which supports the magnetism converging member, is fixed at a position facing the circuit board in the axial direction.

12. The motor as set forth in claim 8, wherein
the rotor is arranged radially inside the stator; and
the sensor is arranged on or radially outside an imaginary circle that connects radially inner ends of the teeth in the circumferential direction.

13. The motor as set forth in claim 8, wherein
on a rotor side of the sensor, a magnetism converging member is provided in close proximity to the sensor to converge the magnetism of the magnets.

14. The motor as set forth in claim 13, wherein:
the rotor is arranged radially inside the stator;
the sensor is arranged radially outside an imaginary circle that connects radially inner ends of the teeth in the circumferential direction; and
the magnetism converging member is arranged on or radially outside the imaginary circle.

15. The motor as set forth in claim 13, wherein
circumferential and axial dimensions of the magnetism converging member are set so that when viewed along a radial direction, the magnetism converging member covers a sensing point, which senses the magnetism of the magnets, of the sensor.

\* \* \* \* \*